United States Patent [19]

Van Den Enden

[11] Patent Number: 5,799,128
[45] Date of Patent: Aug. 25, 1998

[54] STORAGE AND RETRIEVAL OF A DATA REDUCED DIGITAL VIDEO SIGNAL IN/ FROM A MEMORY AND RECORDING AND REPRODUCTION OF A DATA REDUCED DIGITAL VIDEO SIGNAL ON A LONGITUDINAL RECORD CARRIER

[75] Inventor: Gijsbert J. Van Den Enden, Eindhoven, Netherlands

[73] Assignee: U.S. Philips Corporation, New York, N.Y.

[21] Appl. No.: 527,245

[22] Filed: Sep. 12, 1995

[30] Foreign Application Priority Data

Sep. 13, 1994 [EP] European Pat. Off. ............. 94202627
Jun. 23, 1995 [EP] European Pat. Off. ............. 95201714

[51] Int. Cl.$^6$ .................................................. H04N 5/783
[52] U.S. Cl. ................................................. 386/68; 386/111
[58] Field of Search .............................. 386/109, 111, 386/112, 124, 46, 68, 81; H04N 5/76, 5/78, 5/783

[56] References Cited

U.S. PATENT DOCUMENTS 4,807,053  2/1989  Heijnemans ............................ 358/335
5,140,437  8/1992  Yonemitsu et al. ...................... 386/111
5,371,602  12/1994  Tsuboi et al. .......................... 386/111
5,587,805  12/1996  Park ...................................... 386/111

Primary Examiner—Thai Tran
Assistant Examiner—Huy Nguyen
Attorney, Agent, or Firm—Michael E. Belk

[57] ABSTRACT

Method and an arrangement for recording a data reduced digital video signal, the data reduced digital video signal including first signal blocks having data reduced video information obtained from video information of a picture that has been subjected to an intra-picture encoding step, and including second signal blocks having data reduced video information obtained from video information of a picture that has been subjected to an inter-picture encoding step. The data reduced video signal is recording in a number of tracks on the longitudinal record carrier (10). First signal blocks and the second signal blocks are separated from each other (2) and channel encoded (4,12). Channel encoded first signal blocks are written in at least one first track ($T_1$), and channel encoded second signal blocks are written in at least one second track ($T_2$). Further, in order to make the bit-rate of the signals written in the at least one first track and the at least one second track substantially constant, it may be needed to write second signal blocks in the at least one first track, or first signal blocks in the at least one second track.

26 Claims, 9 Drawing Sheets

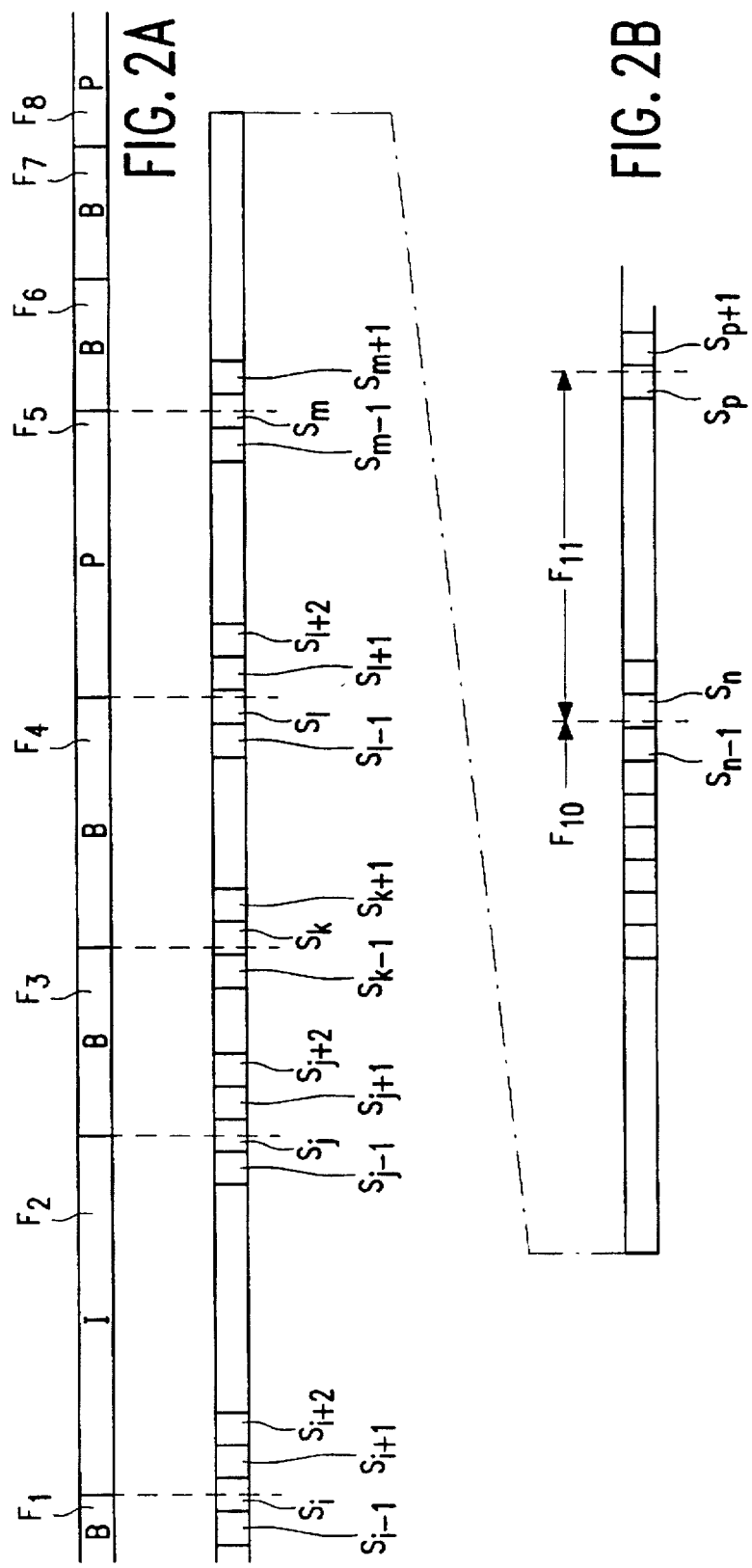

5,799,128

STORAGE AND RETRIEVAL OF A DATA REDUCED DIGITAL VIDEO SIGNAL IN/ FROM A MEMORY AND RECORDING AND REPRODUCTION OF A DATA REDUCED DIGITAL VIDEO SIGNAL ON A LONGITUDINAL RECORD CARRIER

BACKGROUND OF THE INVENTION

1. Field of the Invention

The invention relates to a method of recording a data reduced digital video signal in tracks on a longitudinal record carrier, the recording method comprising the steps of receiving the data reduced digital video signal, writing the data reduced digital video signal in said tracks, the data reduced digital video signal comprising first signal blocks having data reduced video information obtained from video information of a picture that has been subjected to an intra-picture encoding step, and comprising second signal blocks having data reduced video information obtained from video information of a picture that has been subjected to an inter-picture encoding step, a recording and reproducing arrangement for recording/reproducing a data reduced digital video signal in/from tracks on a longitudinal record carrier and a longitudinal record carrier obtained by the recording arrangement. The invention also relates to an apparatus for retrieving a data reduced digital video signal from a memory, such as a hard disk memory.

2. Description of the Related Art

The method and arrangements in accordance with the opening paragraph are known from U.S. Pat. No. 4,807,053 (PHN 11.768), hereby incorporated in whole by reference document (D1) in the list of references that can be found at the end of this application. The known method and recording arrangement provide a recording of a data reduced digital video signal such that reproduction in a feature or trick mode is possible. Feature or trick modes are those reproduction modes in which the transport speed of the longitudinal record carrier is other than nominal, where the nominal transport speed is the speed at which the data reduced digital video signal was recorded originally. Non-nominal transport speeds are transport speeds higher or lower than the nominal transport speed.

The known arrangements may be of the helical scan type.

SUMMARY OF THE INVENTION

The invention aims at providing recording and reproducing of a data reduced digital video signal using a recording/ reproducing arrangement of the linear recording type. Further, the invention aims at providing recording of a data reduced digital video signal such that reproduction in a feature mode is possible, more specifically, that reproduction during a feature mode with a record carrier speed higher than the nominal speed is possible.

In accordance with the invention, the method as defined in the opening paragraph is characterized in that the recording method further comprises the steps of recording the data reduced video signal in tracks running in the longitudinal direction of the record carrier, generating additional information having a relation to the sequence of the signal blocks in the data reduced video signal and supplying said additional information to at least a number of said first and second signal blocks, supplying first signal blocks to first writing means for writing in at least one first track, supplying second signal blocks to second writing means for writing in at least one second track, and supplying second signal blocks to said first writing means for writing in said at least one first track, or supplying first signal blocks to said second writing means for writing in said at least one second track, so as to make the bitrate of the signals written in said at least one first track and said at least one second track substantially constant. The invention is based on the following recognition. Reproduction at a speed higher than nominal is restricted to a certain maximum speed. This maximum speed, among others, is determined by the maximum signal processing speed of the electronic circuitry that realize the channel decoding and data expansion that have to be carried out on the information read out from the record carrier during reproduction. By dividing, during recording, the total data reduced video information to be recorded over at least one first and at least one second track, this results in a decrease in data rate in each track, compared to a situation where all information would have been written in one track. Further, the first signal blocks written in the at least one first track will be used during a reproduction in a feature mode. This has the following advantage.

Suppose that only one first track and three second tracks are present and that the reproducing arrangement comprises reproduction electronics that require a predetermined clock frequency in order to be able to reproduce the signals read from the four tracks in real time. In the feature reproduction mode, only the signal read from the one first track will be processed by the reproduction electronics. The reproduction electronics could process this signal at a clock frequency which is one quarter of the predetermined clock frequency mentioned above, assuming the record carrier speed being nominal. The record carrier can now be transported at a speed of four times the nominal speed and the reproduction electronics are still capable of processing the signal read from the one first track and having the four times higher data rate, when the reproduction electronics have the predetermined clock frequency.

Further, the first signal blocks read from the at least one first track can be decoded (that is: data expanded) simply, as they contain video information of a picture that has been subjected to an intra-picture encoding step prior to recording. So, the video information corresponding to a picture can be decoded by itself, without the need of additional information relating to another picture so as to obtain a reproduced picture.

The second signal blocks will (generally) be written in the at least one second track. In order to obtain an equal bit-rate of the signals recorded in both the at least one first track and the at least one second track, it may thus be necessary to write second signal blocks also in the at least one first track or first signal blocks in the at least one second track also.

The data reduced digital video signal may be a video signal of the MPEG type, the first signal blocks in the data reduced digital video signal comprising intra picture encoded video information of the I type.

The draft Grand Alliance HDTV System Specification dated Feb. 22, 1994, hereby incorporated in whole by reference document (D2) in the list of references, more specifically the chapter III of this specification, describes a video compression system for obtaining a data reduced video signal of the MPEG type. The data reduced video signal so obtained comprises a sequence of so-called I-, P- and B-frames. The I-frames each comprise data reduced video information corresponding to a picture that has been encoded in an intra picture encoding step. The P-frames each comprise data reduced video information corresponding to a picture that has been encoded in a predictive (or: unidirectional) inter picture encoding step. The B-frames each comprise data reduced video information corresponding to a picture that has been encoded in a bi-directional inter picture encoding step.

Reproduction in a feature mode can now be realized on the basis of the first signal blocks read from the at least one first track, that comprise the data reduced video information comprised in I-frames of the MPEG-type video signal.

Second signal blocks may comprise inter picture encoded video information of the P type or may comprise bi-directionally inter-picture encoded information of the B type. As a result, the second signal blocks are normally recorded in the at least one second track. In the situation where second signal blocks are recorded in the at least one first track, in order to keep the bit-rate in the at least one first track and the at least one second track substantially constant, those second signal blocks are however not used during reproduction in a feature mode where the record carrier velocity is higher than nominal.

The method may be further characterized in that the data reduced video signal further comprises third signal blocks having data reduced video information obtained from video information of a picture that has been subjected to a bi-directional inter-picture encoding step, the method further comprising the steps of supplying the third signal blocks to said writing means, and writing said third signal blocks in a track on the record carrier. Also in this case, the data reduced video signal may be a video signal of the MPEG type, the data reduced video signal is a video signal of the MPEG type, the first signal blocks in the data reduced digital video signal comprising intra picture encoded video information of the I type, the second signal blocks in the data reduced digital video signal comprising inter picture encoded video information of the P type and the third signal blocks in the data reduced digital video signal comprising bi-directionally inter-picture encoded information of the B type. In this embodiment, the signal blocks comprising bi-directionally inter-picture encoded information of the B type are now separately identified as third signal blocks. Again, the third signal blocks may normally be written in the at least one second track, or may be written in the at least one first track so as to make the bit-rate in the at least one first track substantially equal to the bit-rate in the at least one second track.

In another embodiment, the third signal blocks are normally written in at least one third track. Again, third signal blocks may be written in the at least one first track or the at least one second track so as to make the bit-rates in the at least one first, second and third tracks substantially equal.

The recording arrangement for recording the data reduced digital video signal in tracks on a longitudinal record carrier, the recording arrangement comprising an input terminal for receiving the data reduced digital video signal, writing means for writing the data reduced digital video signal in said tracks, the data reduced digital video signal comprising first signal blocks having data reduced video information obtained from video information of a picture that has been subjected to an intra-picture encoding step, and comprising second signal blocks having data reduced video information obtained from video information of a picture that has been subjected to an inter-picture encoding step, is characterized in that the recording arrangement is a recording arrangement of the linear recording type, the writing means comprising first writing means for writing information in at least one first track running in the longitudinal direction of the record carrier and second writing means for writing information in at least one second track running in the longitudinal direction on the record carrier, additional information generator means being present for generating additional information having a relation to the sequence of the signal blocks in the data reduced video signal, combining means being present for supplying said additional information to at least a number of said first and second signal blocks, multiplexer means being present adapted to supply first signal blocks to said first writing means for writing in said at least one first track, and being also adapted to supply second signal blocks to said second writing means for writing in said at least one second track, the multiplexer means further being adapted to supply first signal blocks to said second writing means for writing in said at least one second track, or to supply second signal blocks to said first writing means for writing in said at least one first track, so as to make the bit-rate of the signals written in said at least one first track and said at least one second track substantially constant.

The reproducing arrangement for reproducing the data reduced digital video signal, recorded in tracks on a longitudinal record carrier, comprises reading means for reading the data reduced digital video signal from said tracks, an output terminal for supplying the data reduced digital video signal, the data reduced digital video signal comprising first signal blocks having data reduced video information obtained from video information of a picture that has been subjected to an intra-picture encoding step prior to recording, and comprising second signal blocks having data reduced video information obtained from video information of a picture that has been subjected to an inter-picture encoding step prior to recording, is characterized in that the reproducing arrangement is a reproducing arrangement of the linear reproducing type, the reading means comprising first reading means for reading information recorded in at least one first track running in the longitudinal direction of the record carrier and second reading means for reading information recorded in at least one second track running in the longitudinal direction on the record carrier, the first reading means being adapted to read first signal blocks and second signal blocks (if present) from said at least one first track, the second reading means being adapted to read first signal blocks (if present) and second signal blocks from said at least one second track, detection means being present for detecting additional information which has a relation to the sequence of the signal blocks in the data reduced video signal prior to recording, which additional information has been stored in at least a number of said first and second signal blocks prior to recording, combination means being present for combining in a 'normal play' reproduction mode, the first signal blocks and the second signal blocks in response to said detected additional information, so as to obtain a first replica of said data reduced digital video signal, and that in a 'trick play' reproduction mode, the combination means are further adapted to retrieve the first signal blocks read from said at least one first track only so as to obtain a second replica of said data reduced digital video signal.

The reproducing arrangement for reproducing the data reduced digital video signal, recorded in a track on a longitudinal record carrier in a feature mode with the record carrier speed being larger than nominal, the recording arrangement comprising reading means for reading a signal from said track, decoding means for decoding the signal read from said track so as to obtain the data reduced digital video signal, an output terminal for supplying the data reduced digital video signal, the data reduced digital video signal comprising first signal blocks having data reduced video information obtained from video information of a picture that has been subjected to an intra-picture encoding step prior to recording, and comprising second signal blocks having data reduced video information obtained from video information of a picture that has been subjected to an inter-picture encoding step prior to recording, is characterized in that the reproducing arrangement is a reproducing arrangement of the linear reproducing type, the reading means comprising a reading head for reading information from the track, memory means for storing information read from the track with a first rate and reading out said information with a second rate, said second rate being lower than said first rate, detection means for detecting the start of a first signal block present in the signal read from the track, address generating means for generating read-in addresses at said first rate, and for generating read-out addresses at said second rate, comparator means for comparing a filling degree of the memory means with a threshold value ($T_a$), that the reading means are adapted to carry out the following steps, (a) the address generating means are adapted to generate subsequent read-in addresses at said first rate and read-out addresses at said second rate, starting with a start address, for storing the information in and reading the information from subsequent storage locations in said memory means, (b) that upon the detection of the start of a first signal block present in the information read out from the memory by the detection means, an enable signal is generated so as to enable the decoding unit to start decoding the information corresponding to said first signal block, (c) that upon detection of the current filling degree being larger than or equal to said threshold value, the storage of information in said memory means is terminated, and that the reading means are adapted to return to (a) in response to termination of the decoding of said first signal block.

This embodiment enables the reproduction with a speed which is much higher than allowed for by the clock frequency of the decoder means, in that, on a irregular basis, packets of information, corresponding to a first signal block (or an I-frame, in the case of an MPEG video signal), are read-out and processed at the much lower clock frequency by the decoder means.

BRIEF DESCRIPTION OF THE DRAWINGS

These and other aspects of the invention will be further elucidated in the accompanying figure description. In the figures:

FIG. 2a shows the serial datastream of the data reduced video signal, which is in the form of a video signal of the MPEG type;

FIG. 2b shows the serial datastream of FIG. 2a, subdivided into signal blocks of constant length;

DESCRIPTION OF THE PREFERRED EMBODIMENTS

Figure 1:
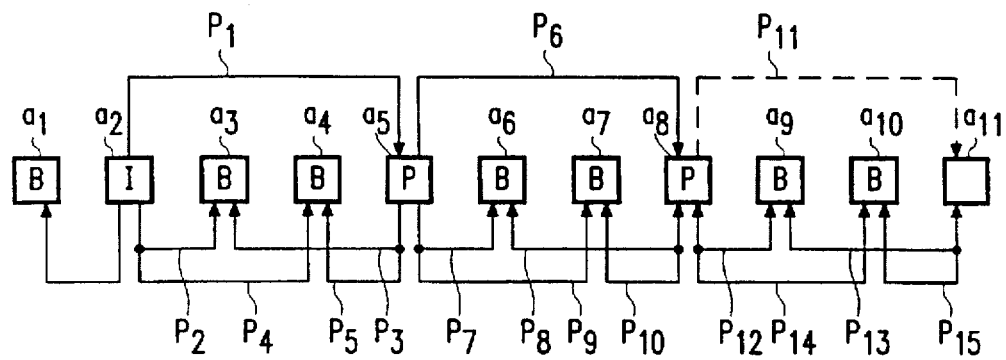
FIG. 1 shows a number of subsequent pictures that have been encoded so as to obtain a data reduced video signal.

FIG. 1 shows schematically a number of subsequent pictures denoted $a_1$ to $a_{10}$. A data reduction step needs to be carried out on the picture information before the video information corresponding to the pictures is recorded on a record carrier. On the video information corresponding to the picture $a_2$ an intra picture encoding step has been carried. Such intra picture encoding step is well known in the art. When included in the MPEG video signal, the data reduced video information corresponding to the picture $a_2$ is comprised in a so-called I-frame of the MPEG video signal. Upon decoding (that is: data expansion), a replica of the picture $a_2$ can be obtained using the information comprised in the I-frame corresponding to the picture $a_2$ alone.

On the video information corresponding to the picture $a_5$, an inter picture ncoding step has been carried. Such inter picture encoding step is well known in the art, and requires (in the present example) the picture $a_2$ to enable the inter picture encoding step. When included in the MPEG video signal, the data reduced video information corresponding to the picture $a_5$ is comprised in a so-called P-frame of the MPEG video signal. Upon decoding, a replica of the picture $a_5$ can be obtained using the information comprised in the P-frame corresponding to the picture $a_5$ and the decoded information of the picture $a_2$. This dependency is indicated in FIG. 1 by means of the arrow $p_1$.

On the video information corresponding to the picture $a_3$, a bi-directional inter picture encoding step has been carried. Such bi-directional inter picture encoding step is well known in the art, and requires (in the present example) the pictures $a_2$ and $a_5$ to enable the bi-directional inter picture encoding step. When included in the MPEG video signal, the data reduced video information corresponding to the picture $a_3$ is comprised in a so-called B-frame of the MPEG video signal. Upon decoding, a replica of the picture $a_3$ can be obtained using the information comprised in the B-frame corresponding to the picture $a_3$, as well as the decoded information of the pictures $a_5$ and $a_2$. This dependency is indicated in FIG. 1 by means of the arrows $p_2$ and $p_3$.

On the video information corresponding to the picture $a_4$, a bi-directional inter picture encoding step has been carried. This encoding step again requires (in the present example) the pictures $a_2$ and $a_5$ to enable the bi-directional inter picture encoding step. When included in the MPEG video signal, the data reduced video information corresponding to the picture $a_4$ is comprised in a so-called B-frame of the MPEG video signal. Upon decoding, a replica of the picture $a_4$ can be obtained using the information comprised in the B-frame corresponding to the picture $a_4$, as well as the decoded information of the pictures $a_5$ and $a_2$. This dependency is indicated in FIG. 1 by means of the arrows $p_4$ and $p_5$.

On the video information corresponding to the picture $a_8$, an inter picture encoding step has been carried. Such inter picture encoding step is well known in the art, and requires (in the present example) the picture $a_5$ to enable the inter picture encoding step. When included in the MPEG video signal, the data reduced video information corresponding to the picture $a_8$ is comprised in a so-called P-frame of the MPEG video signal. Upon decoding, a replica of the picture $a_8$ can be obtained using the information comprised in the P-frame corresponding to the picture $a_8$ and the decoded information of the picture $a_5$. This dependency is indicated in FIG. 1 by means of the arrow $p_6$.

Bi-directional inter picture encoding steps have been carried on the pictures $a_6$ and $a_7$. These encoding steps require (in the present example) in both cases the pictures $a_5$ and $a_8$ to enable the bi-directional inter picture encoding step. When included in the MPEG video signal, the data reduced video information corresponding to each of the pictures $a_6$, and $a_7$ is comprised in a B-frame, as indicated in FIG. 1. Upon decoding, replicas of the picture $a_6$ and $a_7$ can be obtained using the information comprised in the B-frame corresponding to the picture $a_6$, and $a_7$ respectively and the decoded information of the pictures $a_5$ and $a_8$. This dependency is indicated in FIG. 1 by means of the arrows $p_7$, $p_8$ and $p_9$, $p_{10}$ respectively.

If the picture $a_{11}$ is encoded into a P-frame, the arrow $p_{11}$, indicates the dependency of the picture $a_{11}$ from the picture $a_8$ upon decoding of the picture $a_{11}$. If the picture $a_{11}$ is encoded into an I-frame, no such dependency is present. Either encoded into an I-frame, or encoded into a P-frame, the pictures $a_9$ and $a_{10}$ are dependent of the pictures $a_8$ and $a_{11}$ for their decoding. These dependencies are indicated by the arrows $p_{12}$, $p_{13}$ and $p_{14}$ and $p_{15}$ respectively.

It can be concluded from FIG. 1 that P-frames are dependent of either a previous P-frame or a previous I-frame. B frames are dependent of either a previous I-frame and a subsequent P-frame, or a previous P-frame and a subsequent P-frame, or a previous P-frame and a subsequent I-frame, or a previous I-frame and a subsequent I-frame, if such a sequence exists.

The serial datastream of the MPEG signal obtained from the sequence of pictures $a_{10}$ to $a_{10}$ after MPEG encoding (data compression), is shown in FIG. 2a, where frames $F_1$ to $F_8$ are visible. Each frame comprises the data reduced video information corresponding to a picture. Frame $F_1$ is a B-frame and comprises data reduced video information corresponding to the picture $a_1$. Frame $F_2$ is an I-frame and comprises data reduced video information corresponding to the picture $a_2$. Frame $F_3$ is a B-frame and comprises data reduced video information corresponding to the picture $a_3$, ... and so on.

FIG. 2b shows how the serial datastream of the MPEG video signal is subdivided into a sequence of signal blocks of equal length prior to recording on a longitudinal record carrier. As can be seen in FIG. 2b, the boundary between the frames $F_1$ and $F_2$ falls within the signal block $S_i$, the boundary between the frames $F_2$ and $F_3$ occurs within the signal block $S_j$, the boundary between the frames $F_3$ and $F_4$ occurs within the signal block $S_k$, the boundary between the frames $F_4$ and $F_5$ occurs within the signal block $S_l$, the boundary between the frames $F_5$ and $F_6$ occurs within the signal block $S_m$ and the boundary between the frames $F_{10}$ and $F_{11}$ occurs within the signal block $S_n$. It is assumed that the frame $F_{11}$ is an I-frame.

In accordance with the foregoing, the signal blocks $S_i$ to $S_j$ inclusive are identified as 'first signal blocks', as they comprise I-frame information. In the same way, the signal blocks $S_n$ to $S_p$ inclusive are identified as 'first signal blocks'. In a first embodiment, see FIG. 3, where the signal blocks are divided over only one first track $T_1$ and only one second track $T_2$, the other signal blocks are identified as 'second signal blocks'.

Figure 3:
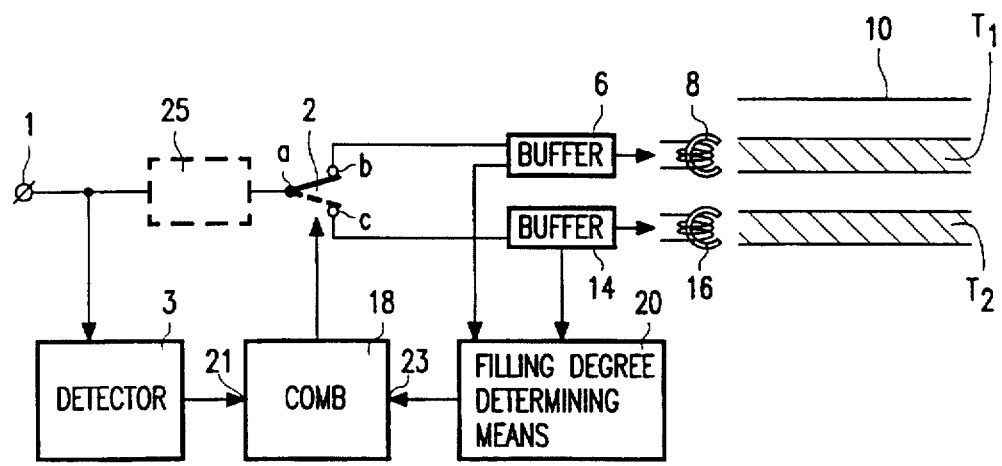
FIG. 3 shows a first embodiment of the recording arrangement.

FIG. 3 shows an embodiment of the recording arrangement in accordance with the invention. An input terminal 1 is coupled to a fixed terminal, denoted 'a', of a switch 2 and to an input of a detector 3. A terminal denoted 'b' of the switch 2 is coupled to an input of a buffer 6, which can be in the form of a FIFO. An output of the buffer 6 is coupled, via a well known channel encoder (not shown), to a writing head 8 for writing information in a first track T, on the record carrier 10, of which only a part is shown. A terminal denoted 'c' of the switch 2 is coupled to an input of a buffer 14, which can be in the form of a FIFO. An output of the buffer 14 is coupled, via a channel encoder (not shown), to a writing head 16 for writing information in a second track $T_2$ on the record carrier 10. A detector 3 is present having an input coupled to the input terminal 1 and an output coupled to a first input 21 of a combining unit 18. Filling degree determining means 20 are present for determining the filling degree of the buffers 6 and 14. An output of the filling degree determining means 20 is coupled to a second input 23 of the combining unit 18, and output of which is coupled to a switching signal input of the switch 2.

It is assumed that the recording starts when an 1-frame, such as the frame $F_2$, is received.

The detector 3 detects for portions in the serial datastream of the MPEG signal received (those portions are the signal blocks indicated in FIG. 2b), whether the portions contain information coming from an I-frame or not. Upon detecting a signal block comprising I-frame information, that is the first signal block Si (see FIG. 2b), the detector 3 generates a first control signal which is applied to the combining unit 18. In response to the first control signal, the combining unit 18 generates a first switching signal which is applied to the switch 2. In response to the first switching signal, the switch is switched into the position a-b. As a result, the first signal blocks $S_i, S_{i+1}, S_{i+2}, \ldots$ etc. are applied to the buffer 6 and subsequently written in the track $T_1$ by the head 8. Recording continues until the detector 3 detects that the signal block $S_{j+1}$ comprises 'non I-frame' information, see also FIG. 2b. The detector 3 now generates a second control signal which is applied to the combining unit 18. In response to the second control signal, the combining unit 18 generates a second switching signal which is applied to the switch 2. In response to the second switching signal, the switch is switched into the position a-c. As a result, the second signal blocks $S_{j+1}, S_{j+2}, S_{j+3}, \ldots$ etc. are applied to the buffer 14 and subsequently written in the track $T_2$ by the head 16. Recording continues until the detector 3 detects that the signal block $S_n$ comprises I-frame information, see FIG. 2b. The detector 3 again generates a first control signal which is applied to the combining unit 18, the switch is switched into the position a-b. As a result, the first signal blocks $S_n, S_{n+1}, S_{i+2}, \ldots$ to $S_p$ are applied to the buffer 6 and subsequently written in the track $T_1$ by the head 8. Upon detection of the fact that the signal block $S_{p+1}$ comprises 'non I-frame' information, see FIG. 2b, by the detector 3, the switch is switched into the position a-c. As a result, the second signal blocks $S_{p+1}, S_{p+2}, S_{p+3}, \ldots$ etc. are applied to the buffer 14 and subsequently written in the track $T_2$ by the head 16.

As the information to be written in the tracks $T_1$ and $T_2$ are supplied by the switch 2 on a discontinuous basis, the buffers 6 and 14 are needed so as to enable a continuous recording of information in the tracks $T_1$ and $T_2$. It may however occur that, with the switch 2 in the position a-c, the buffer 6 may become empty, or the buffer 14 may become completely full. This should be avoided, as this results in no information being recorded in the track $T_1$ or information for recording in the track $T_2$ being lost respectively.

The filling degree determining means 20 now compare the filling degree of the buffers with a predetermined minimum and maximum filling degree level.

In response to either the filling degree of the buffer 6 becoming lower than said predetermined minimum filling degree level, or the filling degree of the buffer 14 becoming larger than said predetermined maximum filling degree level, the means 20 generate a first detection signal and supply the first detection signal to the second input 23 of the combining unit 18. In response to said first detection signal, the combining unit 18 now generates a switching control signal to the switch 2 such that, although second signal blocks are applied to the input 1 and thus a second control signal is supplied by the detector 3, the switch is positioned in the a-b position. The switching over between the position a-c and the position a-b should preferably take place at the boundaries of signal blocks.

Conversely, if the switch 2 in the position a-b, the buffer 6 may become completely filled, or the buffer 14 may become empty. This should also be avoided, as this results in no information being recorded in the track $T_2$ or information for recording in the rack $T_1$ being lost, respectively.

In response to either the filling degree of the buffer 14 becoming lower than said predetermined minimum filling degree level, or the filling degree of the buffer 6 becoming larger than said predetermined maximum filling degree level, the means 20 generate a second detection signal and supply the second detection signal to the second input 23 of the combining unit 18. In response to said second detection signal, the combining unit 18 now generates a switching control signal to the switch 2 such that the switching position is changed from a-b to a-c. The switching over from the position a-b to the position a-c should preferably take place at the boundaries of signal blocks. More specifically, if first signal blocks are applied to the input 3, so that the detector 3 supplies a first control signal, the switching over from the position a-b to a-c may be delayed until the detection of the first second signal block in the serial datastream, if the total memory space available in the buffer 6 enables a continued storage of information in the buffer 6.

In order to enable a reproduction of the information recorded in the two tracks $T_1$ and $T_2$, it will be needed to insert 'some sequence number information' in the datastream supplied to the heads 8 and 16. This is realized by the block denoted 25 in FIG. 3.

Figure 4:
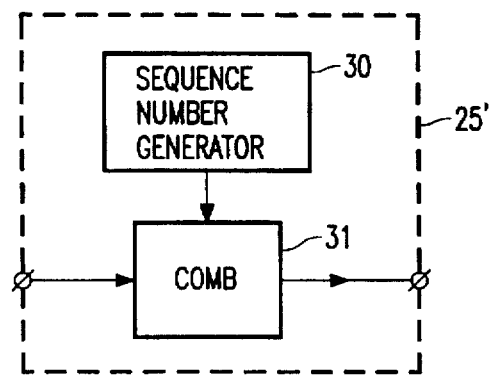
FIG. 4 shows a further elaboration of one of the elements in the recording arrangement of FIG. 3.

One embodiment of the block 25 is shown in FIG. 4. The block in FIG. 4, denoted by 25' comprises a sequence number generator 30 and a combining unit 31. The generator 30 generates a sequence of subsequent numbers with a rate equal to the rate with which the signal blocks $S_i$ are applied to the input terminal 1. The combining unit 31 now inserts a sequence number in each one of the signal blocks.

In a modified version, the sequence of signal blocks that are applied to one of the buffers between two switchings over of the switch 2, receive the same sequence number. After a switching over of the switch to the other position, the next sequence of signal blocks receive a subsequent sequence number, until the next switching over occurs. Again the sequence number is increased and the next sequence of signal blocks receive the increased sequence number. In again another modified version, only the signal blocks directly following the switching over of the switch 2 to the other position receive a sequence number.

Figure 5:
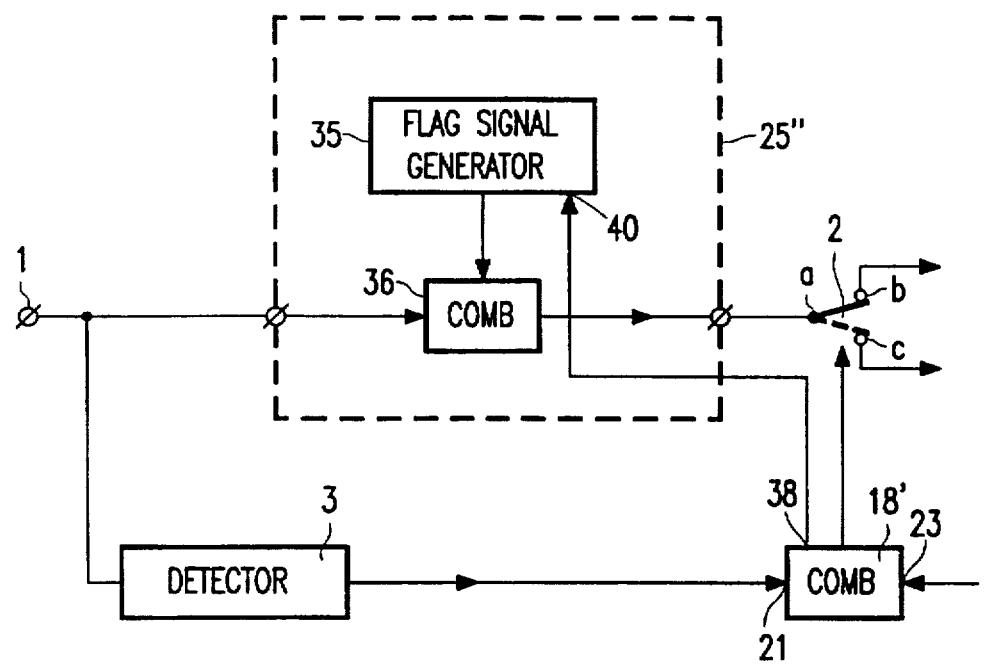
FIG. 5 shows another elaboration of the said element.

Another embodiment of the block 25 is shown in FIG. 5. The block in FIG. 5, denoted by 25" comprises a flag signal generator 35 and a combining unit 36. Further, the combining unit 18 of FIG. 3 is of a slightly different construction and is denoted 18' in FIG. 5. The combining unit 18' has a further output 38 which is coupled to a control signal input 40 of the flag signal generator 35. The combining unit 18' generates a signal at its output 38 indicating the position of the switch 2 or generating a signal indicating that the position of the switch changes. The generator 35 generates in response to the signal applied to the input 40, a flag signal indicating that the switch position is changed. A flag signal is only stored in the signal block that is applied to the buffer 6 at first after switching over from the position a-c to the position a-b, and a flag signal is only stored in the signal block that is applied to the buffer 14 at first after switching over from the position a-b to the position a-c.

In a modification of this embodiment, the last signal block applied to an encoder receives the flag signal. In the example of FIG. 2b, those are the signal blocks $S_j, S_{l-1}, S_m, \ldots S_{n-1}, \ldots$ It should be noted here, that the insertion of the sequence number information or the flag signal information need not necessarily take place before the switch 2. It may be possible to insert the sequence number information or the flag signal information in the signal blocks after the switch.

Figure 6:
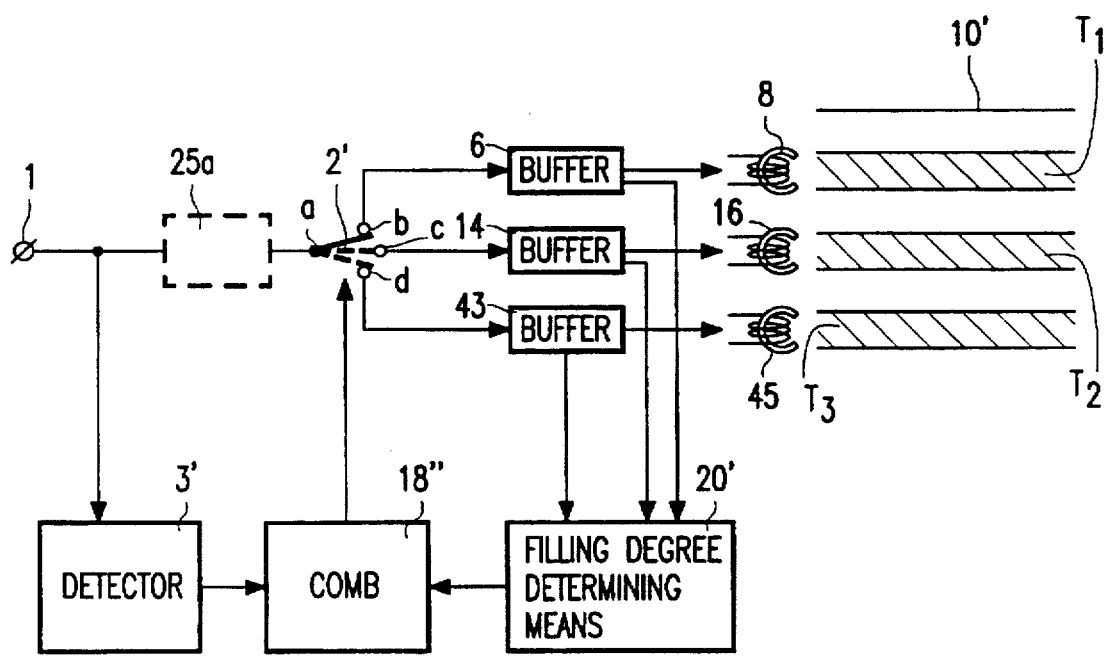
FIG. 6 shows a second embodiment of the recording arrangement.

FIG. 6 shows another embodiment of the recording arrangement. The arrangement shows large resemblances with the embodiment of FIG. 3. Therefore, identical elements present in both embodiments have the same reference number. The embodiment of FIG. 6 further comprises a buffer 43 and a writing head 45. The switch is slightly different and is denoted by 2'. It has a terminal d, which is coupled to an input of the buffer 43. The head 45 is adapted to write information supplied by the buffer 43 and encoded in a channel encoder (not shown) in a third track $T_3$ on the record carrier 10'.

Again, it can be said that the recording starts when an I-frame, such as the frame $F_2$ in FIG. 2a, is received.

The detector 3' detects for signal blocks in the serial datastream applied to the input I whether the signal blocks contain information coming from an I-frame, or contain information coming from a P-frame or contain information coming from a B-frame. Upon detecting a signal block comprising I-frame information, that is the first signal block Si (see FIG. 2b), the detector 3' generates a first control signal which is applied to the combining unit 18". In response to the first control signal, the combining unit 18" generates a first switching signal which is applied to the switch 2'. In response to the said first switching signal, the switch is switched into the position a-b. As a result, the first signal blocks $S_i$, $S_{i+1}$, $S_{i+2}$, ... etc., are applied to the buffer 6 and subsequently written in the track $T_1$ by the head 8. Recording continues until the detector 3' detects that the signal block $S_{j+1}$ comprises B-frame information, see also FIG. 2b. The detector 3' now generates a third control signal which is applied to the combining unit 18". In response to the third control signal, the combining unit 18" generates a third switching signal which is applied to the switch 2'. In response to the said third switching signal, the switch is switched into the position a-d. As a result, the second signal blocks $S_{j+1}$, $S_{j+2}$, $S_{j+3}$, ... etc., are applied to the buffer 43 and subsequently written in the track $T_3$ by the head 45. Recording continues until the detector 3' detects that the signal block S. comprises P-frame information, see FIG. 2b. The detector 3' generates a second control signal which is applied to the combining unit 18", the switch is switched into the position a-c. As a result, the first signal blocks $S_l$, $S_{l+1}$, $S_{l+2}$, ... to $S_m$, are applied to the buffer 14 and subsequently written in the track $T_2$ by the head 19. Upon detection of the fact that the signal block $S_{m+1}$ comprises B-frame information, see FIG. 2b, by the detector 3', the switch is switched into the position a-d. As a result, the third signal blocks $S_{m+1}$, $S_{m+2}$, $S_{m+3}$, ... etc., are applied to the buffer 43 and subsequently written in the track $T_3$ by the head 45.

The filling degree determining means 20' now compare the filling degree of the buffers 6, 14 and 43 with a predetermined minimum and maximum filling degree level.

In response to the filling degree of the buffer 6 becoming lower than said predetermined minimum filling degree level, it will be necessary to apply either second signal blocks or third signal blocks, or both to the buffer 6, for recording in the track $T_1$. In response to the filling degree of the buffer 14 becoming lower than said predetermined minimum filling degree level, it will be necessary to apply either first signal blocks or third signal blocks, or both to the buffer 14, for recording in the track $T_2$. In response to the filling degree of the buffer 43 becoming lower than said predetermined minimum filling degree level, it will be necessary to apply either first signal blocks or second signal blocks, or both to the buffer 43, for recording in the track $T_3$.

Further, in response to the filling degree of the buffer 6 becoming larger than said predetermined maximum filling degree level, it will be necessary to apply first signal blocks to either the buffer 14 or the buffer 43 for recording in either the track $T_2$ or the track $T_3$, respectively. In response to the filling degree of the buffer 14 becoming larger than said predetermined maximum filling degree level, it will be necessary to apply second signal blocks to either the buffer 6 or the buffer 43 for recording in either the track $T_1$ or the track $T_3$, respectively. In response to the filling degree of the buffer 43 becoming larger than said predetermined maximum filling degree level, it will be necessary to apply third signal blocks to either the buffer 6 or the buffer 14 for recording in either the track $T_1$ or the track $T_2$, respectively.

The means 20' generate a control signal in response to one of the situations mentioned above. In response to such control signal, the combining unit 18" generates a corresponding switching signal to the switch 2' so that it is switched into the required position.

In order to enable a reproduction of the information recorded in the three tracks $T_1$, $T_2$ and $T_3$, it will be needed to insert 'some sequence number information' in the datastream supplied to the heads 8, 16 and 45. This is realized by the block denoted 25a in FIG. 6.

One embodiment of the block 25a equals the embodiment of the block 25 of FIG. 4. In this embodiment, a sequence number is inserted in each of the signal blocks or in only specific signal blocks, such as the signal blocks directly following the switching over of the switch 2' to another position.

Another embodiment of the block 25a is equivalent to the embodiment shown in FIG. 5, so that it requires a combining unit 18" provided with the output 38 which is shown in FIG. 5. The flag signal generator 35 now may generate in response to the signal applied to the input 40, a flag signal indicating that the switch 2' is switched into another position. Moreover, the flag signal indicates to which position the switch should be positioned. Consequently, the flag signal generator 35 generates a first flag signal if the switch is switched into the position a-b, a second flag signal indicating that the switch 2' is switched into the position a-c or a third flag signal indicating that the switch 2' is switched into the position a-d.

During the application of the signal blocks $S_i$ to $S_j$ to the buffer 6, see FIG. 2b, a third flag signal is stored in the last signal block that is applied to the buffer 6: that is the signal block $S_j$. Now the signal blocks $S_{j+1}$ to $S_{l-1}$ are applied to the buffer 43. Next, the second flag signal is stored in the last signal block that is applied to the buffer 43: that is the signal block $S_{l-1}$. Next, a third flag signal is supplied to the signal block $S_m$, which is the last signal block applied to the buffer 14. This is continued until the first flag signal is stored in the signal block $S_{n-1}$.

It should also be noted here, that the insertion of the sequence number information or the flag signal information need not necessarily take place before the switch 2'. It may be possible to insert the sequence number information or the flag signal information in the signal blocks after the switch.

Figure 7:
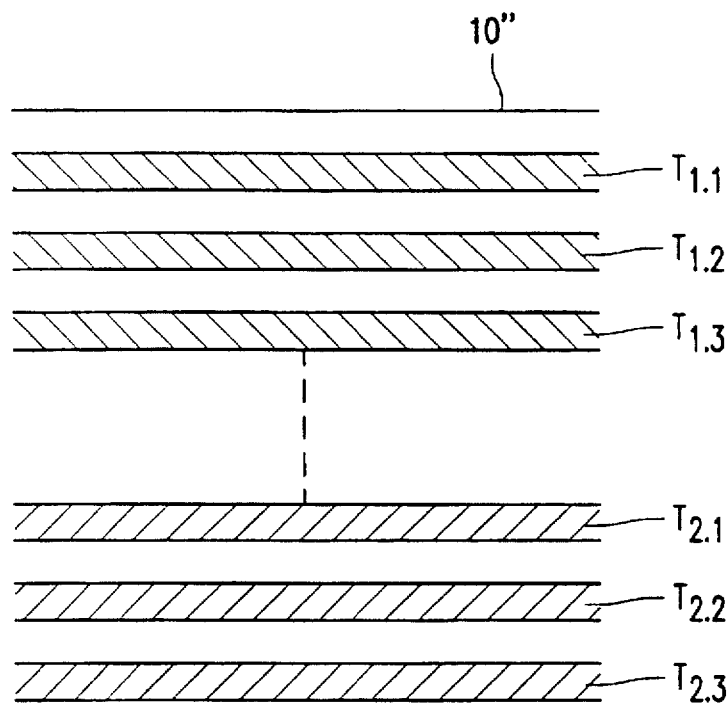
FIG. 7 shows an embodiment of the record carrier.

Other embodiments of the recording arrangement are possible, such as the embodiment of FIG. 3, where the channel signal provided by the buffer 6 is divided over and stored in two or more first tracks $T_{1,1}$, $T_{1,2}$, $T_{1,3}$, ... and the channel signal provided by the buffer 14 is divided over and stored in two or more second tracks $T_{2,1}$, $T_{2,2}$, $T_{2,3}$, ..., see FIG. 7, which shows an embodiment of a record carrier 10" having the said tracks recorded on it.

In an equivalent way, the embodiment of FIG. 6 could have been modified by dividing the each channel signal provided by one or more of the buffers 6, 14 and 43 over two or more tracks that run parallel to each other in the length direction of the record carrier.

Figure 8:
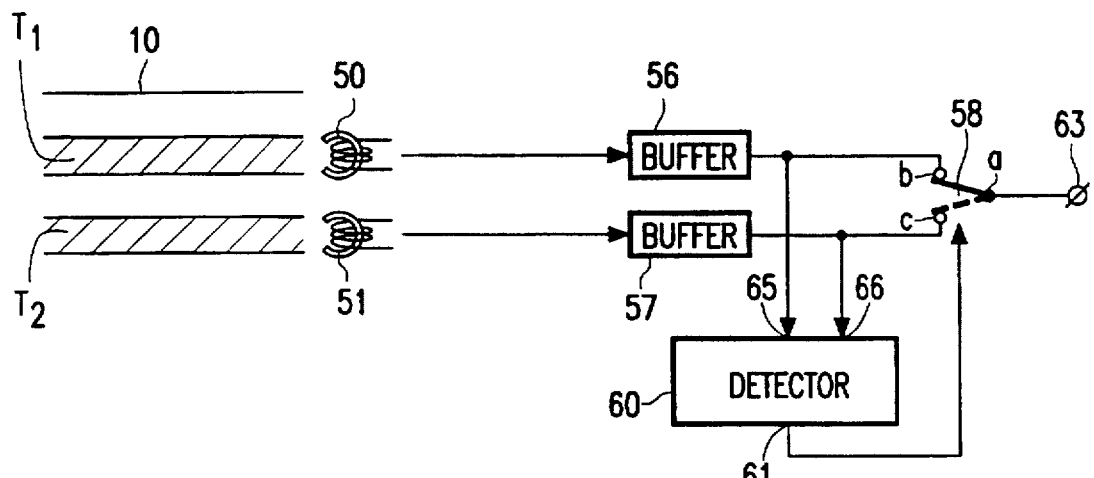
FIG. 8 shows a first embodiment of the reproducing arrangement.

FIG. 8 shows an embodiment of the reproducing arrangement in accordance with the invention, for reproducing information from a first track $T_1$ and a second track $T_2$ on the record carrier 10, which has been obtained by the recording arrangement of FIG. 3. Read heads 50 and 51 are present for reading information from the first track $T_1$ and the second track $T_2$ respectively the record carrier 10. Outputs of the read heads 50 and 51 are coupled, via well known channel decoder circuitry (not shown), to inputs of buffers 56 and 57, respectively. Outputs of the buffers 56 and 57 are coupled to a terminal b and c respectively of a switch 58. The buffers 56 and 57 may be in the form of a FIFO. A fixed terminal a of the switch 58 is coupled to an output terminal 63 of the arrangement. Further, a detector 60 is present having inputs 65 and 66 coupled to the outputs of the buffers 56 and 57 respectively. An output 61 of the detector 60 is coupled to a switching control input of the switch 58. The detector 60 generates a switching control signal at its output 61 so as to control the position of the switch 58.

Signal blocks are read from the tracks $T_1$ and $T_2$ by the heads 50 and 51 and are supplied to the buffers 56 and 57 respectively.

Figure 9:
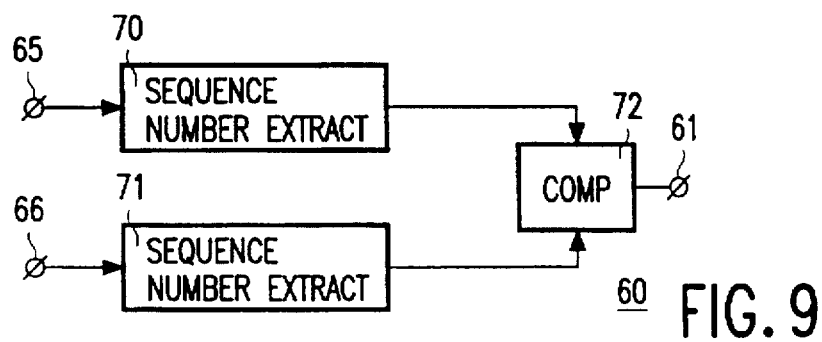
FIG. 9 shows an elaboration of the detector in the reproducing arrangement of FIG. 8.

In one embodiment of the detector 60, shown in FIG. 9, the detector detects the sequence numbers that are stored in each of the signal blocks. The detector of FIG. 9 comprises sequence number extractors 70 and 71 having inputs coupled to the inputs 65 and 66 respectively of the detector 60. Outputs of the extractors 70 and 71 are coupled to respective inputs of a comparator 72, an output of which is coupled to the output of the detector 60. The comparator 72 compares the sequence numbers extracted from the signal blocks obtained from the buffer 56 with the sequence numbers extracted from the signal blocks obtained from the buffer 57. If the sequence number of a signal block present at the output of the buffer 56 is smaller than the sequence number of the block present at the output of the buffer 57, the comparator 72 generates a first switching control signal, which results in the switch 58 being positioned in the position b-a. This is the case when (replicas of) the signal blocks $S_i$ to $S_j$, see FIG. 2b, are supplied by the buffer 56 and (the replica of) the signal block $S_{j+1}$ is present (and waits) at the output of the buffer 57.

As it is assumed that reproduction starts with the reproduction of signal blocks having I-frame information, the switch 58 is thus initially positioned in the position b-a.

First signal blocks are continuously supplied to the output of the buffer 56 and supplied to the output terminal 63, until the signal block $S_j$ is supplied to the output. The next signal block at the output of buffer 56 is the signal block $S_n$, see FIG. 2b. The comparator 72 now detects that the sequence number of the signal block $S_n$ supplied by the extractor 70 is larger than the sequence number of the signal block $S_{j+1}$, so that the comparator generates a second switching signal at its output. Under the influence of this signal, the switch is switched to the c-a position. The outputting of signal blocks from the buffer 56 is now stopped and the buffer 57 now outputs signal blocks which signal blocks are applied to the output terminal 63. After having output the signal block $S_{n-1}$, see FIG. 2b, the comparator detects that the sequence number of the signal block $S_n$ present and waiting at the output of the buffer 56 is smaller than the sequence number of the signal block present at that instant (probably, this is the signal block $S_{p+1}$) at the output of the buffer 57. As a result, the first switching signal is generated and the switch 58 is switched to the b-a position. In this way, the original sequence of the signal blocks is reconstructed.

The above described embodiment of the detector 60 also functions properly for the modified version in which, during recording, see FIG. 3, the sequence of signal blocks that are applied to one of the tracks between two switchings over of the switch 2, receive the same sequence number, and for the other modified version in which during recording, only the signal blocks directly following the switching over of the switch 2 to the other position receive a sequence number.

Figure 10:
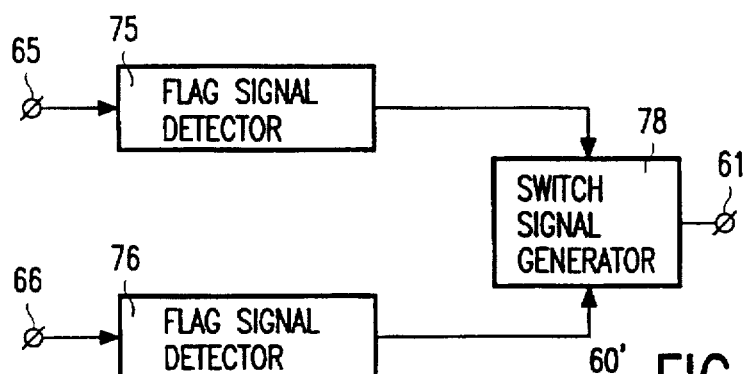
FIG. 10 shows another elaboration of the detector.

Another embodiment of the detector 60 is shown in FIG. 10. The detector in FIG. 10, denoted by 60' comprises flag signal detectors 75 and 76 having inputs coupled to the inputs 65 and 66 respectively of the detector 60'. Outputs of the detectors 75 and 76 are coupled to corresponding inputs of a switching control signal generator 78.

During reproducing the first signal blocks $S_i$ to $S_j$, see FIG. 2b, the switch 58 is in the position b-a and the signal blocks are supplied by the buffer 56 to the output terminal 63. The signal block $S_{j+1}$ is present and waits at the output of the buffer 57. At the instant that the signal block $S_n$ appears at the output of the buffer 56, the detector 75 detects the presence of the flag signal stored in that signal block. In response to the detection of the flag signal, a detection signal is supplied by the detector 75 to the generator 78. In response thereto, the generator 78 generates a second switching control signal, under the influence of which the switch 58 switches to the position c-a. The signal blocks $S_{j+1}$ to $S_{n-1}$ are now supplied to the output terminal 63 by the buffer 57. The signal block $S_n$ is present and waits at the output of the buffer 56. The signal block which will occur at the output of the buffer 57 after having supplied the signal block $S_{n-1}$, will include a flag signal. Upon the detection of this flag signal by the detector 76, a first switching control signal is supplied by the generator 78 so that the switch 58 switches into the b-a position. The supply of signal blocks by the buffer 56 is now resumed, resulting in a reconstruction of the original sequence of the signal blocks.

In a modification, the flag signals are stored in the signal blocks $S_j$, $S_{i-1}$, $S_m$, . . . , $S_{n-1}$, . . . . This results in the switching signal to be generated one signal block later in time.

When only a flag signal is used to indicate the moment of switching of the switch 58, it may be possible that when starting reproduction, the switch is in the wrong position. This can be detected in the (MPEG) decoder (not shown) that is coupled to the output terminal 63. Upon such detection by the decoder, an additional switching signal can be generated, so that the switch is switched to its correct switching phase.

It should be noted here, that the detection of the sequence number information or the flag signal information need not necessarily take place after the buffers 56 and 57. It may be possible to detect the sequence number information or the flag signal information earlier in the signal paths, where such detection is possible.

Figure 11:
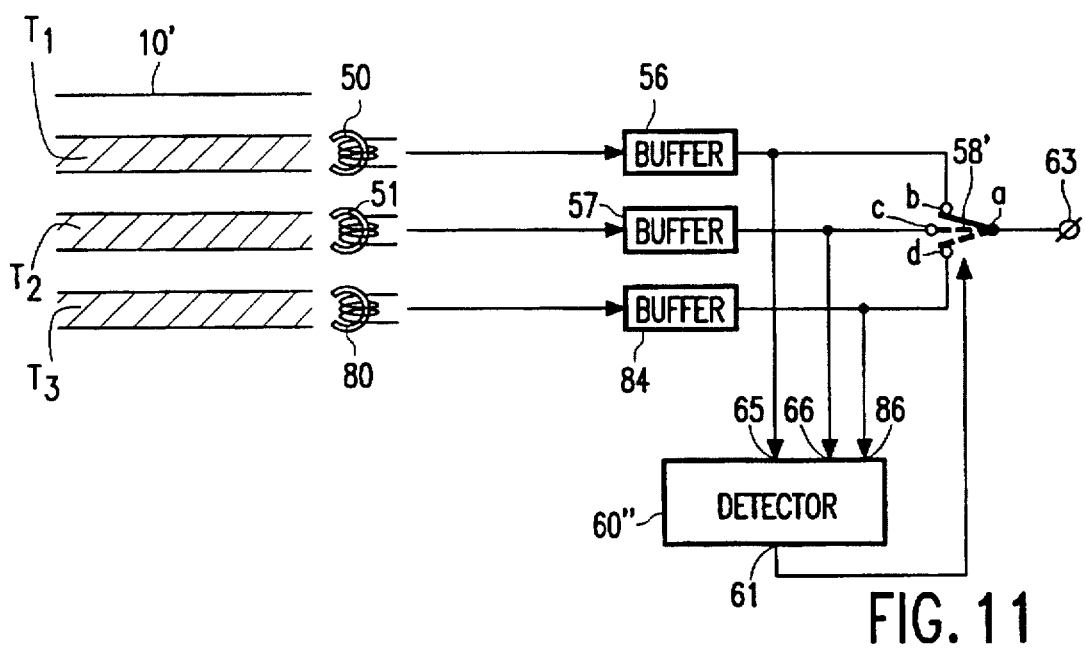
FIG. 11 shows a second embodiment of the reproducing arrangement.

FIG. 11 shows another embodiment of the reproducing arrangement, for reproducing information from a first track $T_1$, a second track $T_2$ and a third track $T_3$ on the record carrier 10'. This record carrier 10' has been obtained by the recording arrangement of FIG. 6. Read heads 50, 51 and 80 are present for reading information from the first, second and third track $T_1$, $T_2$ and $T_3$ respectively of the record carrier 10'. Outputs of the read heads 50, 51 and 80 are coupled to inputs of buffers 56, 57 and 84, respectively, via channel decoding circuitry (not shown). Outputs of the buffers 56, 57 and 84 are coupled to a terminal b, c and d respectively of a switch 58'. The buffers may be in the form of a FIFO. Further, a detector 60" is present having inputs 65, 66 and 86 coupled to the outputs of the buffers 56, 57 and 84 respectively.

Signal blocks are read from the tracks $T_1$, $T_2$ and $T_3$ by the heads 50, 51 and 80, and are supplied to the buffers 56, 57 and 84 respectively and stored therein.

Figure 12:
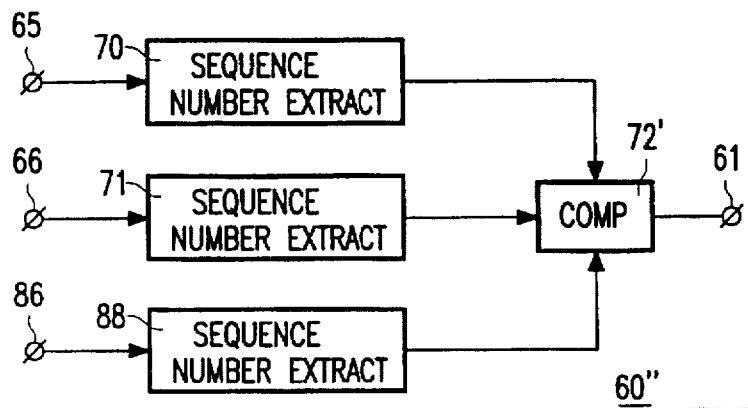
FIG. 12 shows an elaboration of the detector in the reproducing arrangement of FIG. 11.

In one embodiment of the detector 60", shown in FIG. 12, the detector detects the sequence numbers that are stored in each of the signal blocks. The detector of FIG. 12 comprises sequence number extractors 70, 71 and 88 having inputs coupled to the inputs 65, 66 and 86 respectively of the detector 60". Outputs of the extractors 70, 71 and 88 are coupled to respective inputs of a comparator 72', an output of which is coupled to the output of the detector 60". The comparator 72' compares the sequence numbers extracted from the signal blocks obtained from the buffer 56 with the sequence numbers extracted from the signal blocks obtained from the buffer 57 and with the sequence numbers extracted from the signal blocks obtained from the buffer 84. If the sequence number of a signal block present at the output of the buffer 56 is smaller than the sequence numbers of the signal blocks present at the output of the buffers 57 and 84, the comparator 72' generates a first switching control signal, which results in the switch 58' being positioned in the position b-a. This is the case when (replicas of) the signal blocks $S_i$ to $S_j$, see FIG. 2b, are supplied by the buffer 56, (the replica of) the signal block $S_{j+1}$ is present (and waits) at the output of the buffer 84, and (the replica of) the signal block $S_l$ is present (and waits) at the output of the buffer 57.

As it is assumed that reproduction starts with the reproduction of signal blocks having I-frame information, the switch 58 is thus initially positioned in the position b-a.

First signal blocks are continuously supplied to the output of the buffer 56 and supplied to the output terminal 63, until the signal block $S_j$ is supplied to the output. The next signal block at the output of buffer 56 is the signal block $S_n$, see FIG. 2b. The comparator 72' now detects that the sequence number of the signal block $S_n$ supplied by the extractor 70 is larger than the sequence numbers of the signal block $S_{j+1}$ present and waiting at the output of the buffer 84 and the signal block S, which is present and waiting at the output of the buffer 57. More specifically, the detector 60" detects the sequence number of the signal block $S_{j+1}$ present and waiting at the output of the buffer 84 to be the smallest. As a result, the comparator 72' generates a third switching signal at its output. Under the influence of this signal, the switch 58' is switched to the d-a position. The outputting of signal blocks from the buffer 56 is now stopped and the buffer 84 now outputs signal blocks which signal blocks are applied to the output terminal 63. After having output the signal block $S_{l-1}$, see FIG. 2b, the comparator detects that the sequence number of the signal block $S_l$ present and waiting at the output of the buffer 57 is smaller than the sequence number of the signal block present at that instant (probably, this is the signal block $S_{m+1}$) at the output of the buffer 84 and smaller than the sequence number of the signal block present at that instant (probably, this is the signal block $S_n$ at the output of the buffer 56. As a result, the second switching signal is generated and the switch 58' is switched to the c-a position. Now, the outputting of signal blocks from the buffer 84 is stopped and the signal blocks $S_l$ to $S_m$ are applied to the output terminal 63 by the buffer 57. In this way, the original sequence of the signal blocks is reconstructed.

The above described embodiment of the detector 60" also functions properly for the modified version in which, during recording, see FIG. 3, the sequence of signal blocks that are applied to one of the tracks between two switchings over of the switch 2, receive the same sequence number, and for the other modified version in which during recording, only the signal blocks directly following the switching over of the switch 2 to the other position receive a sequence number.

Figure 13:
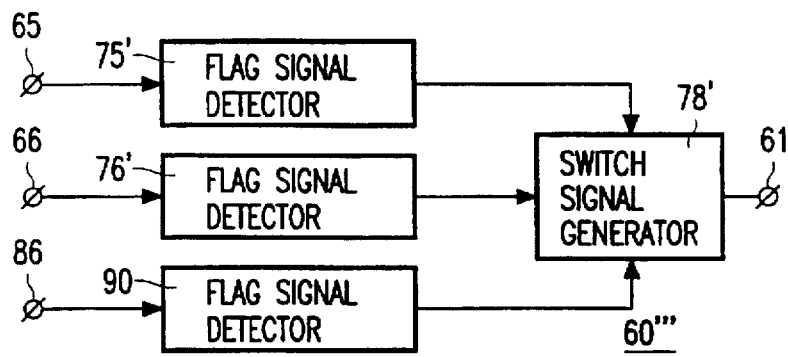
FIG. 13 shows another elaboration of the said detector.

Another embodiment of the detector 60" is shown in FIG. 13. The detector in FIG. 13, denoted by 60"', comprises flag signal detectors 75, 76 and 90 having inputs coupled to the inputs 65, 66 and 86 respectively of the detector 60"'. Outputs of the detectors 75', 76' and 90 are coupled to corresponding inputs of a switching control signal generator 78'.

During reproducing the first signal blocks $S_i$ to $S_j$, see FIG. 2b, the switch 58' see FIG. 11, is in the position b-a and the signal blocks are supplied by the buffer 56 to the output terminal 63. The signal block $S_{j+1}$ is present and waits at the output of the buffer 84 and the signal block $S_l$ is present and waits at the output of the buffer 57. At the instant that the signal block $S_j$ appears at the output of the buffer 56, the detector 75' see FIG. 11 detects the presence of the third flag signal stored in that signal block. In response to the detection of the third flag signal, a detection signal is supplied by the detector 75' to the generator 78'. In response thereto, the generator 78' generates a third switching control signal, under the influence of which the switch 58' switches to the position d-a. The signal blocks $S_{j+1}$ to $S_{l-1}$ are now supplied to the output terminal 63 by the buffer 84. The signal block $S_n$ is present and waits at the output of the buffer 56 and the signal block $S_l$ is still present and waits at the output of the buffer 57. The detector 90 will detect the second flag signal which is stored in the signal block $S_{l-1}$, as soon as that signal block $S_{l-1}$ occurs at the output of the buffer 84. Upon the detection of this second flag signal by the detector 90, a second switching control signal is supplied by the generator 78' so that the switch 58' switches into the c-a position. The supply of signal blocks by the buffer 57 is now started, resulting in the supply of the signal blocks $S_l$ to $S_m$ to the output terminal 63. Next, the detector 76' will detect the third flag signal which is stored in the signal block $S_{m-1}$, as soon as that signal block $S_{m-1}$ occurs at the output of the buffer 57. Upon the detection of this third flag signal by the detector 76', a third switching control signal is supplied by the generator 78' so that the switch 58' switches into the d-a position. The supply of signal blocks by the buffer 84 is now started. As soon as the signal block $S_{n-1}$ is supplied by one of the buffers, the corresponding detector will detect the first flag signal stored in said signal block. Upon the detection of this first flag signal, a first switching control signal is supplied by the generator 78' so that the switch 58' switches into the b-a position. The supply of signal blocks by the buffer 56 is now started. This results in a reconstruction of the original sequence of the signal blocks.

It should be noted here, that the detection of the sequence number information or the flag signal information need not necessarily take place after the buffers 56', 57' and 84. It may be possible to detect the sequence number information or the flag signal information earlier in the signal paths, where such detection is possible.

It will be evident that, in order to reproduce information from a record carrier as described with reference to FIG. 7, an appropriate number of additional reading heads are needed and other signal combining electronics are needed, in order to combine signals read from the various tracks.

Figure 14:
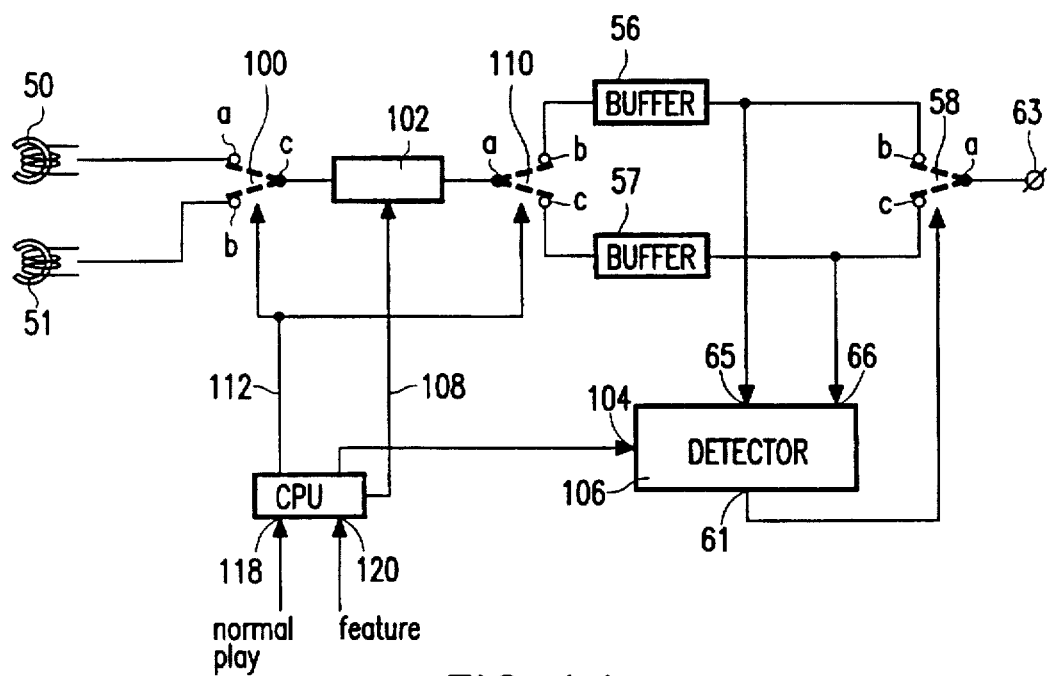
FIG. 14 shows a further elaboration of the arrangement of FIG. 8, when used in a feature mode.

Next, the reproduction of a data reduced video signal during a feature mode will be explained with reference to FIG. 14. FIG. 14 shows the embodiment of FIG. 8 with additional elements that enable the reproduction in a feature mode, more specifically in a reproduction mode in which the speed of the record carrier is e.g. twice the nominal speed. The arrangement further comprises a controllable switch 100 having a terminal a coupled to the head 50 and a terminal b coupled to the head 51. A terminal c of the switch 100 is coupled to an input of channel decoding circuit 102. An output of the channel decoding circuit 100 is coupled to a terminal a of a controllable switch 110. A terminal b of the switch 110 is coupled to the input of the buffer 56 and a terminal c of the said switch is coupled to the input of the buffer 57. The channel decoding circuit 102 realizes, in the normal play reproduction mode, an equalization, a channel demodulation and an error correction separately on each of the two signals read from the tracks by means of the heads 50 and 51. To that purpose, the circuit 102 receives a clock signal from a central processing unit CPU via a line 108.

The position of the switches 100 and 110 is controlled by a control signal supplied via the line 112 to the switches. The detector 60 of FIG. 8 is also present, but is denoted by reference number 106 and has an additional control signal input 104. The central processing unit CPU also supplies a control signal to the detector 106.

When activating a 'normal play' reproduction mode by applying a control signal to the input 118 of the CPU, such control signals are applied to the switches 100 and 110 and to the detector 106, that the switch 100 periodically switches between the positions a-c and b-c with a frequency dictated by the control signal applied to the switch 100 via the line 112. In the same way, the switch 110 switches periodically between the positions a-b and a-c under the influence of that same control signal.

The switching is such that information read by the head 50 is processed in the circuit 102 and supplied to the buffer 56 and information read by the head 51 is processed by the circuit 102 and supplied to the buffer 57. The circuit 102 including the switches 100 and 110 thus act as if separate channel decoding circuits would have been present for channel decoding the signals read by the two heads.

When activating a 'feature play' mode, by applying a control signal to the input 120 of the CPU, such control signal is applied to the switches 100 and 110 that they are in the positions a-c and a-b respectively. The record carrier transport speed may now be twice the nominal record carrier transport speed. The information recorded in the track $T_1$ is now read out with a data-rate which is twice as high. The circuit 102 now carries out a channel decoding on the signal coming from the one track $T_1$, with the increased data-rate. As a result, the channel decoder circuit 102 can function at its nominal processing speed, although the signal read out from the track has an increased data-rate.

The control signal applied by the CPU to the control input 104 of the detector 106 disables the detector 106. In response to this control signal, the detector 106 now generates a switching control signal at its output 61 such that the switch 58 is continuously positioned in the position b-a.

Figure 15:
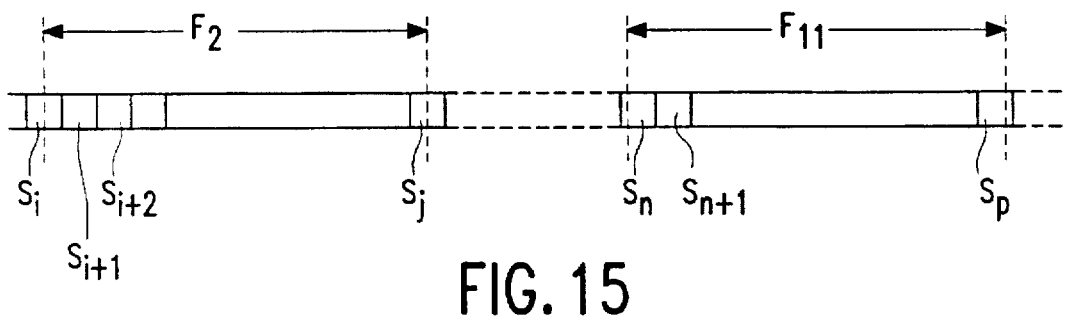
FIG. 15 shows the signal obtained with the embodiment of FIG. 14.

As a result, at the output terminal 63, the datastream shown in FIG. 15 may be obtained. Assuming that the total I-frame information included in the original MPEG datastream is at most equal to half the total information content of the MPEG datastream, this means that all the signal blocks comprising I-frame information will be recorded in the track $T_1$. May be, also some P- or B-frame information is also recorded in the track $T_1$, namely in the case that the total I-frame information is less than the total information content of the MPEG datastream.

FIG. 15 shows how the first signal blocks $S_i$ to $S_j$ are supplied to the output 63 of the arrangement of FIG. 14. These signal blocks comprise the I-frame information included in the frame $F_2$, see FIG. 2a and 2b. If no other signal blocks than first signal blocks are stored in the track $T_1$, this means that after having supplied the signal block $S_j$ to the output 63, the next signal block supplied to the output 63 will be the signal block $S_n$, which is followed by the signal blocks $S_{n+1}$ to $S_p$. These signal blocks comprise the I-frame information included in the frame $F_{11}$, see FIG. 2b.

It may be possible that second signal blocks have been stored in the track $T_1$ in between the signal blocks $S_j$ and $S_n$, namely in the situation where the information content in the I-frames is less than half the total information content of the MPEG datastream. In the further signal processing carried out on the signal read out, only the I-frame information will be used to regenerate a replica of the digital video signal. An MPEG decoder (not shown) coupled to the output 63 will thus realize a processing on the I-frame information which is inverse to the intra-picture encoding step carried out prior to recording, which results in a regenerated I-picture. The second signal blocks that may thus be present in the signal read by the head 50 will thus not be used in the decoder coupled to the output 63. Those second signal blocks, present in the output signal of FIG. 15, which output signal is thus available at the output of the processor circuit 102, can thus be left out. This can be realized in various ways. In one way, the switch 110 is switched in the position a-c as soon as second signal block information is supplied by the decoder circuit 102, so that no second signal block information is stored in the buffer 56. In another embodiment, the switch 58 has an additional position in which the terminal a is coupled to an open terminal. The switch 58 is switched to said open terminal when the buffer 56 supplies second signal block information to its output, so that no second signal block information is supplied to the MPEG decoder coupled to the output 63. In another embodiment, the MPEG decoder itself ignores the second signal block information that is supplied to its input.

As can be seen from FIG. 15, always complete I-frames are present in the reproduced output signal, such as the frames $F_2$ and $F_{11}$. Those reproduced I-frames can be decoded separately in an MPEG decoder so as to obtain the pictures $a_2$ and $a_{11}$, see FIG. 1. Those pictures can be stored in a picture memory (not shown) so as to enable a subsequent display of the pictures on a screen.

Figure 16:
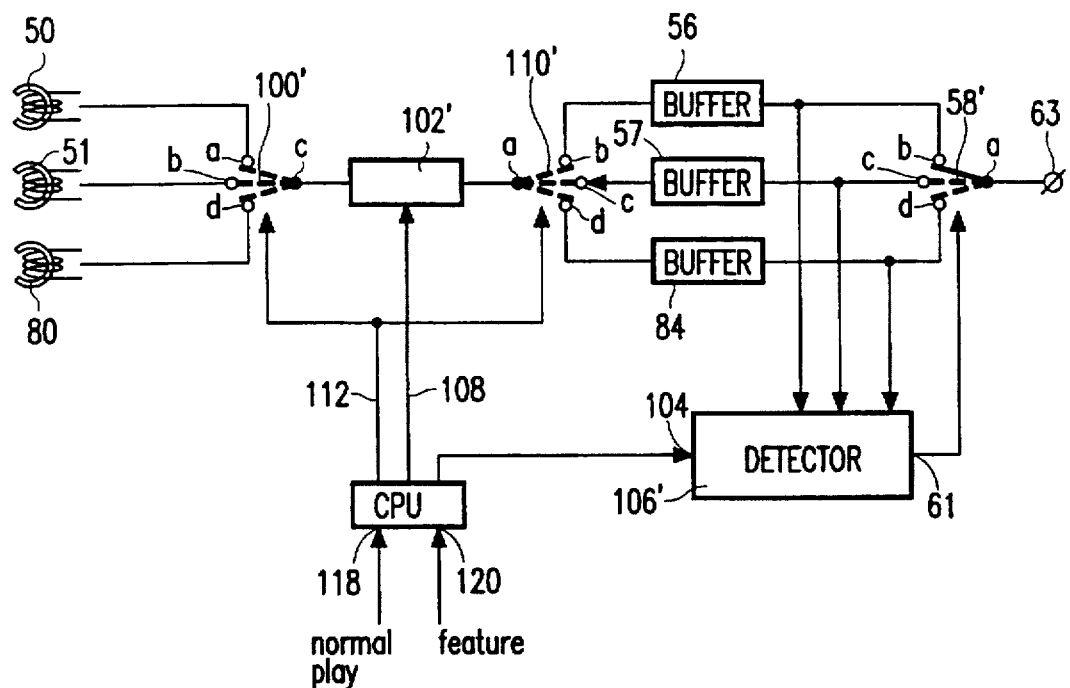
FIG. 16 shows a further elaboration of the arrangement of FIG. 11, when used in a feature mode.

Next, the reproduction of a data reduced video signal during a feature mode of the reproducing arrangement of FIG. 11 will be explained. FIG. 16 shows the embodiment of FIG. 11 with additional elements that enable the reproduction in a feature mode, more specifically in a reproduction mode in which the speed of the record carrier is, e.g., thrice the nominal speed. The arrangement further comprises a controllable switch 100' having terminals a, b and d coupled to the heads 50, 51 and 80 respectively, and a terminal c coupled to an input of channel decoding circuit 102'. An output of channel decoding circuit 102' is coupled to a terminal a of a controllable switch 110'. Terminals b, c and d of the switch 110' are coupled to the inputs of the buffers 56, 57 and 84, respectively. The channel decoding circuit 102' realizes in the normal play reproduction mode an equalization, a channel demodulation and an error correction separately on each of the three signals read from the tracks by means of the heads 50, 51 and 80. To that purpose, the circuit 102' receives a clock signal from a central processing unit CPU via a line 108.

The position of the switches 100' and 110' is controlled by a control signal supplied via the line 112 to the switches. The detector 60" of FIG. 11 is also present, but is denoted by reference number 106' and has an additional control signal input 104. The central processing unit CPU also supplies a control signal to the detector 106'.

When activating a 'normal play' reproduction mode by applying a control signal to the input 118 of the CPU, such control signals are applied to the switches 100' and 110' and to the detector 106', that the switch 100' periodically switches between the positions a-c, b-c and d-c with a frequency dictated by the control signal applied to the switch 100' via the line 112. In the same way, the switch 110' switches periodically between the positions a-b, a-c and a-d under the influence of that same control signal.

The switching is such that information read by the head 50 is processed in the circuit 102' and supplied to the buffer 56, information read by the head 51 is processed by the circuit 102' and supplied to the buffer 57 and information read by the head 80 is processed by the circuit 102' and supplied to the buffer 84. The circuit 102' including the switches 100' and 110' thus act as if separate channel decoding circuits would have been present for channel decoding the signals read by the three heads.

When activating a 'feature play' mode, by applying a control signal to the input 120 of the CPU, such control signal is applied to the switches 100' and 110' that they are in the positions a-c and a-b respectively. The record carrier transport speed may now be thrice the nominal record carrier transport speed. The information recorded in the track $T_1$ is now read out with a data-rate which is thrice as high. The circuit 102' now carries out a channel decoding on the signal coming from the one track $T_1$ with the increased data-rate. As a result, the channel decoder circuit 102' can function at its nominal processing speed, although the signal read out from the track has an increased data-rate.

The control signal applied by the CPU to the control input 104 of the detector 106' disables the detector 106'. In response to this control signal, the detector 106' now generates a switching control signal at its output 61 such that the switch 58' is continuously positioned in the position b-a.

As a result, at the output terminal 63, again the datastream shown in FIG. 15 may be obtained. This with the assumption that the total I-frame information included in the original MPEG datastream is at most equal to one third of the total information content of the MPEG datastream. This means that all the signal blocks comprising I-frame information will be recorded in the track $T_1$. May be, also some P- or B-frame information is also recorded in the track $T_1$, namely, in the case that the total I-frame information is less than the total information content of the MPEG datastream.

In the case that the total I-frame information content is larger than one third of the total MPEG information, I-frame information has also been recorded in the track $T_2$ or $T_3$. Those I-frame information will thus not be read out and will thus be skipped during reproduction in the feature mode.

Although the embodiments of FIG. 14 and 16 have been described in a feature mode where the record carrier speed is twice and thrice the nominal record carrier speed, respectively, it is also possible to realize a feature mode with a record carrier speed larger than twice or thrice the record carrier speed, even without increasing the processing speed in the channel decoders. This will be explained hereafter.

It should be noted that reproduction method that will be described hereafter is applicable to the embodiments of FIG. 14 and 16, but is not limited thereto.

The reproduction method is equally well applicable to state of the art linear reproducing arrangements for reproducing an MPEG video signal from a track on a longitudinal record carrier.

Figure 17:
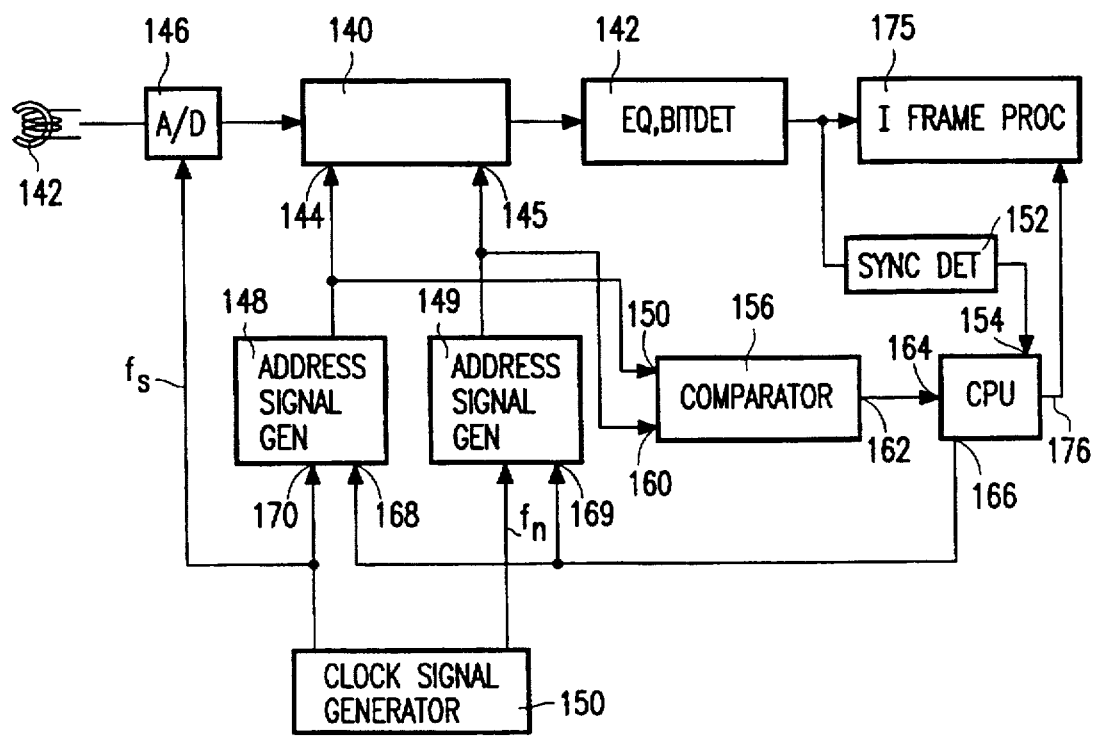
FIG. 17 shows an embodiment of an arrangement for storing I-frame information in a memory during a feature mode.

FIG. 17 shows a memory 140 of such a size that it is capable of storing an I-frame of maximum length. During reproduction in a feature mode with a record carrier speed much higher than two or three times the nominal speed, the signal read from a track by the head 142 is sampled and A/D converted in an A/D converter 146 with a sampling rate $f_s$ which is equal to $N.f_n$ where $f_n$ is the nominal sampling rate by when the apparatus is in the normal play mode. N is equal to the ratio between the 'trick play' reproduction speed and the nominal reproduction speed. Next the sampled and A/D converted signal is stored in the memory 140 under the influence of a write address signal applied to an address signal input 144 of the memory 140. The write addresses are generated by an address generator 148, having its address signal output coupled to the input 144 of the memory 140. The sampling frequency $f_s$ equals the clock rate supplied to the generator 148, and is supplied by a clock signal generator 150. The address generator 148 generates addresses starting from a first address value corresponding to the address of the first address location in the memory 140, and subsequent address values up to the highest address value corresponding to the address of the last address location in the memory 140. Further a read address signal generator 149 is present supplying read address signals under the influence of the clock frequency $f_n$ supplied by the generator 150. These read addresses are supplied to an address input 145 of the memory 140. Samples are thus stored in the memory 140 with a high bit-rate and read out from the memory with a nominal bit-rate. The circuit following the memory 140 can thus process the signals at its nominal clock frequency $f_n$.

The circuit following the memory 140 comprises a circuit 142 which realizes an equalization and bit detection on the signals supplied by the memory 140 and a signal processing circuit 175, which is adapted to process information comprised in an I-frame, so as to obtain a picture.

Further, a sync detector 152 is present and capable of detecting a sync signal that is present in each I-frame. More specifically, the I-, P- and B frames may have the same sync signal. In that case, each frame comprises an identifier, identifying the frame as either an I-frame, or a P-frame or a B-frame. The detector 152 is then also capable of detecting the I-frame identifier.

An input of the detector 152 is coupled to the output of the circuit 142 and an output of the detector 152 is coupled to a control signal input 154 of a central processing unit CPU.

Further a comparator 156 is present having inputs 150 and 160 coupled to outputs of the address signal generators 148 and 149 respectively. An output 162 of the comparator 156 is coupled to an input of a central processing unit CPU. A control signal output 166 of the CPU is coupled to control signal inputs 168 and 169 of the address signal generators 148 and 149 respectively.

Figure 18:
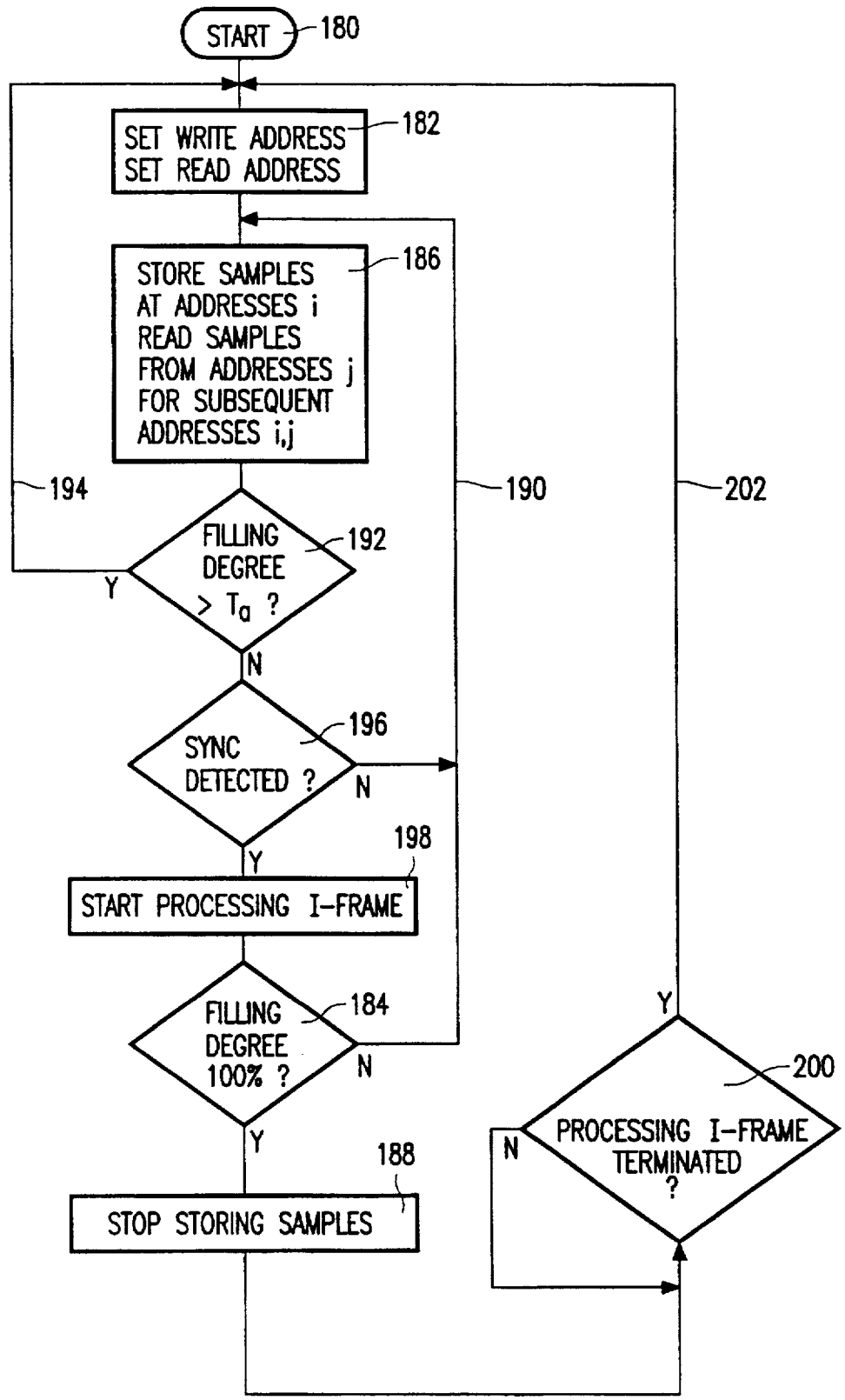
FIG. 18 shows a flow diagram of a method for storing the I-frame information in the memory with the arrangement of FIG. 17.

The functioning of the embodiment of FIG. 17 will be further explained with reference to the flow diagram in the FIG. 18.

The reproduction in the feature mode starts in block 180. Next the start addresses of the address generators 148 and 149 are set to a start address value, which is, in the present example, equal to zero, see block 182. Samples of the reproduced signal arrive at the input of the memory 140 and are stored in the memory under the influence of the write addresses supplied to the input 144 with the frequency $f_s$. Samples stored in the memory 140 are read out in the meantime under the influence of read addresses supplied to the input 145 with the lower frequency $f_n$. This is realized in the block 186 in the flow diagram of FIG. 18. The samples read out at the nominal frequency are processed in the circuit 142. The processing circuit 175 is disabled at this moment under the influence of the control signal supplied by the CPU over the line 176.

The comparator 156 compares the difference between the instantaneous read and write addresses with a threshold value $T_a$. The difference between the instantaneous read and write address is a measure for the filling degree of the memory 140. If the filling degree of the memory 140 is too high, while no I-sync has been detected yet, this means that the processing circuits 142 and 175 will not be capable of detecting and fully processing an I-frame using the information content stored in the memory 140. The comparison by the comparator 156 is realized in block 192 in FIG. 18. If the result of the comparison in block 192 is confirmative, the program returns to block 182 via the line 194. The read and write 10 address are reset and the program restarts. It may however be possible to restart the program by making the read address equal to the present write address and resume the program in block 186.

If the comparison in block 192 is affirmative, the program continues to block 196. If no sync signal is detected by the detector 152, the program continues via the line 190.

Upon detection of a sync signal by the sync detector 152, see the block 196, a detection signal is supplied by the detector 152 to the CPU. Upon the receipt of the detection signal, the CPU enables the processor circuit 175 by means of an enable signal via the line 176. Samples belonging to the I-frame, of which the I-sync was detected by the detector 152 are now stored in a memory (not shown) in the processor 175 and the processor circuit 175 starts processing the information content of the I-frame which is still partly stored in the memory 140 and which is supplied to the circuit 175.

The storage of samples in the memory 140 can be continued as long as the filling degree of the memory 140 is 100%, see block 184 and the line 190, so that it may be possible to detect a second I-sync. If the filling degree reaches the 100% value, the storing of samples in the memory 140 is terminated, see block 188.

In block 200, it is determined when the I-frame has been received completely by the circuit 175. If so, the program returns to block 182. The storage of information in the memory 140 is now resumed, starting from the first address value, as indicated above.

If, however, the read address value has been made equal to the current write address value in the signal path 202, the storage of information is continued starting from the current write address of the generator 148.

The clock frequency for supplying the read addresses by the generator 149 or the read-out of samples from the memory 140, will be lower than the clock frequency for supplying the write addresses to the memory 140, for the read-in of samples. In this way, the higher data-rate of the incoming data, supplied by the head 142, can be adapted to the lower clock frequency of the processing circuits 142 and 175.

Figure 19:
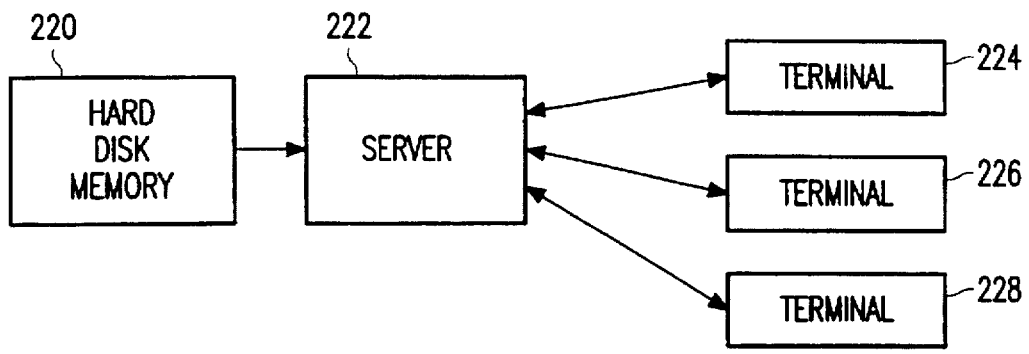
FIG. 19 shows an embodiment of a video-on-demand system.

FIG. 19 shows schematically an embodiment in accordance with the invention, in the form of a video-on-demand system. The system comprises a random access memory 220, such as a hard disk arrangement, which is coupled to a server 222. Terminals 224, 226 and 228 are located at customer's premises and may be in the form of set-top boxes. By inputting command signals into a terminal, a user of the terminal is capable of selecting one of a number of movies that are stored in data reduced form on the hard disk in the hard disk arrangement 220. The server 222 receives the command signals and selects the appropriate movie by addressing the storage locations on the hard disk where the movie to be retrieved is stored. The data reduced digital video signal retrieved from the hard disk is transmitted to the terminal by means of the server 222. Moreover, the user is capable of selecting various modes of operation, such as a normal play mode and various trick play modes.

Figure 20:
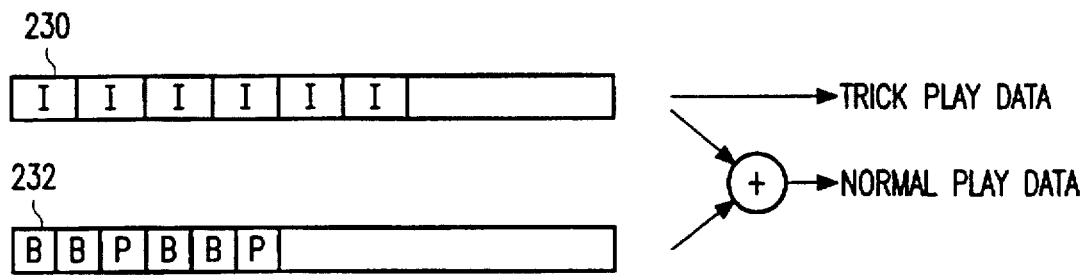
FIG. 20 shows the split information streams of a data reduced digital video signal as stored on the hard disk arrangement included in the video-on-demand system of FIG. 19.

FIG. 20 shows schematically how the data reduced digital video signal of a movie is stored on the hard disk. The total information content corresponding to the movie in question is split up into at least two separate information streams 230 and 232. The first information stream 230 comprise all the I frames of the data reduced digital information signal corresponding to the movie in question. The at least second information stream comprise the B frames, and, if no other third information stream is present, also the P frames. If at least a third information stream is present, the second information stream comprise B frames only and the third information stream comprise the P frames.

During a reproduction in the normal play mode both the information streams 2and 232 are retrieved from the hard disk and the two information streams are combined in the server 222 so as to obtain the data reduced digital video signal that is supplied to the receiving terminal. In the terminal, a data expansion is carried out so as to make the video signal ready for display on a TV screen (not shown) located at the user's premises. If the user selects a trick play mode, the server retrieves only the first information stream from the hard disk and supplies the information to the receiving terminal, in which the I frames can be decoded so as to obtain a reproduction of the I frames at a required rate.

Figure 21:
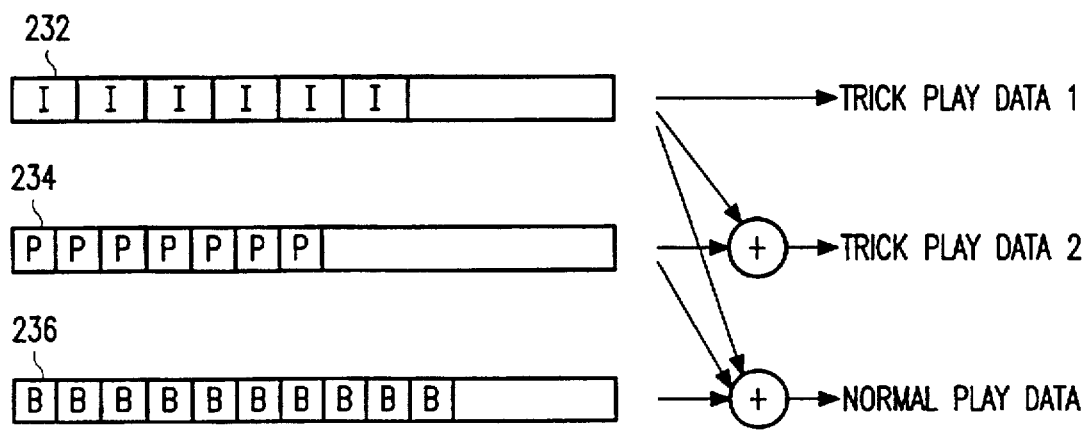
FIG. 21 shows another configuration of split information streams of a data reduced digital video signal as stored on the hard disk arrangement included in the video-on-demand system of FIG. 19.

FIG. 21 shows another embodiment of the arrangement of FIG. 19, where the I frames are stored in a separate storage region 232, the P frames are stored in a separate storage region 234 and the B frames are stored in again another separate storage region 236. During 'normal play', all the frames stored in the three storage regions 232, 234 and 236 are combined so as to regenerate the original serial datastream of frames so as to regenerate the digital video signal.

In a first 'trick play' mode of operation, only the I frames are retrieved from the storage region 232 are used to generate a replica of the digital video signal. In a second 'trick play' mode of operation, the I and P frames stored in the storage regions 232 and 234 are retrieved and combined to generate a replica of the digital video signal.

The recreation of a replica of the digital video signal in any one of the modes described thus far, may require the insertion of 'sequence number information', as explained hereinbefore with reference to the FIG. 4, or may require the insertion of 'time stamps'.

Earlier filed applications U.S. patent application Ser. No. 08/225,193, having a filing date of Apr. 8, 1994 (PHN 14.818), document (D3) in the list of related documents, and U.S. patent application Ser. No. 08/253,535, having a filing date of Jun. 3, 1994 (PHA 21.886), now U.S. Pat. No. 5,596,581; document (D4) in the list of related documents, describe the insertion of time stamps to realize a recording and reproduction of an MPEG information signal. These citations are hereby incorporated in whole by reference.

I claim:

1. Method of recording a data reduced digital video signal in tracks on a longitudinal record carrier, the recording method comprises the steps:

receiving the data reduced digital video signal; and writing the data reduced digital video signal in said tracks, the data reduced digital video signal comprising first signal blocks having data reduced video information obtained from video information of a picture that has been subjected to an intra-picture encoding step, and comprising second signal blocks having data reduced video information obtained from video information of a picture that has been subjected to an inter-picture encoding step, characterized in that, the recording method further comprises the steps:

recording the data reduced video signal in tracks running in the longitudinal direction of the record carrier;

generating additional information having a relation to the sequence of the signal blocks in the data reduced video signal and supplying said additional information to at least a number of said first and second signal blocks;

supplying first signal blocks to first writing means for writing in at least one first track;

supplying second signal blocks to second writing means for writing in at least one second track; and supplying second signal blocks to said first writing means for writing in said at least one first track, or supplying first signal blocks to said second writing means for writing in said at least one second track, so as to make the bit-rate of the signals written in said at least one first track and said at least one second track substantially constant.

2. Method as claimed in claim 1, wherein the second signal blocks have data reduced video information obtained from video information of a picture that has been subjected to a uni-directional inter-picture encoding step, characterized in that the data reduced video signal further comprises third signal blocks having data reduced video information obtained from video information of a picture that has been subjected to a bi-directional inter-picture encoding step, the method further comprising the steps:

supplying the third signal blocks to said writing means; and writing said third signal blocks in a track on the record carrier.

3. Method as claimed in claim 2, characterized in that the method further comprises the steps:

supplying third signal blocks to said second writing means; and writing said third signal blocks in said at least one second track.

4. Method as claimed in claim 3, characterized in that the method further comprises the steps:

supplying third signal blocks to said first writing means; and writing said third signal blocks in said at least one first track so as to make the bit-rate of the signals written in said at least one first track and said at least one second track substantially constant.

5. Method as claimed in claim 2, characterized in that the method further comprises the steps:

supplying said additional information to at least a number of said third signal blocks;

supplying third signal blocks to third writing means for writing in at least one third track running in the longitudinal direction of the record carrier; and supplying first signal blocks to said second or third writing means for writing in said at least one second or third tracks respectively, or supplying second signal blocks to said first or third writing means for writing in said at least one first or third track, respectively, or supplying third signal blocks to said first or second writing means for writing in said at least one first or second track, respectively, so as to make the bit-rate of the signals written in said at least one first track, said at least one second track and said at least one third track substantially constant.

6. Method as claimed in claim 1, characterized in that the data reduced video signal is a video signal of the MPEG type, the first signal blocks in the data reduced digital video signal comprising intra picture encoded video information of the I type.

7. Method as claimed in claim 2, characterized in that the data reduced video signal is a video signal of the MPEG type, the first signal blocks in the data reduced digital video signal comprising intra picture encoded video information of the I type, the second signal blocks in the data reduced digital video signal comprising inter picture encoded video information of the P type and the third signal blocks in the data reduced digital video signal comprising bi-directionally inter-picture encoded information of the B type.

8. Recording arrangement for recording a data reduced digital video signal in tracks on a longitudinal record carrier, the recording arrangement comprising:

an input terminal for receiving the data reduced digital video signal; and writing means for writing the data reduced digital video signal in said tracks; the data reduced digital video signal comprising first signal blocks having data reduced video information obtained from video information of a picture that has been subjected to an intra-picture encoding step, and comprising second signal blocks having data reduced video information obtained from video information of a picture that has been subjected to an inter-picture encoding step, characterized in that, the recording arrangement is a recording arrangement of the linear recording type, the writing means comprising first writing means for writing information in at least one first track running in the longitudinal direction of the record carrier and second writing means for writing information in at least one second track running in the longitudinal direction on the record carrier, said recording arrangement further comprising:

additional information generator means for generating additional information having a relation to the sequence of the signal blocks in the data reduced video signal;

combining means for supplying said additional information to at least a number of said first and second signal blocks; and multiplexer means for supplying first signal blocks to said first writing means for writing in said at least one first track, and for supplying second signal blocks to said second writing means for writing in said at least one second track, the multiplexer means further supplying first signal blocks to said second writing means for writing in said at least one second track, or for supplying second signal blocks to said first writing means for writing in said at least one first track, so as to make the bit-rate of the signals written in said at least one first track and said at least one second track substantially constant.

9. Recording arrangement as claimed in claim 8, characterized in that the data reduced video signal further comprises third signal blocks having data reduced video information obtained from video information of a picture that has been subjected to a bi-directional inter-picture encoding step, the multiplexer means being further adapted to supply third signal blocks to said writing means, and the writing means further being adapted to write said third signal blocks in a track on the record carrier.

10. Recording arrangement as claimed in claim 9, characterized in that the multiplexer means are also adapted to supply third signal blocks to said second writing means for writing in said at least one second track.

11. Recording arrangement as claimed in claim 10, characterized in that the multiplexer means are further adapted to supply third signal blocks to said first writing means for writing in said at least one first track so as to make the bit-rate of the signals written in said at least one first track and said at least one second track substantially constant.

12. Recording arrangement as claimed in claim 9, characterized in that the combining means is further adapted to supply said additional information to at least a number of said third signal blocks, the writing means further comprising third writing means for writing information in at least one third track running in the longitudinal direction of the record carrier, the multiplexer means being further adapted to supply third signal blocks to said third writing means for writing in said at least one third track, the multiplexer means further being adapted to supply first signal blocks to said second or third writing means for writing in said at least one second or third track, respectively, or to supply second signal blocks to said first or third writing means for writing in said at least one first or third track, respectively, or to supply third signal blocks to said first or second writing means for writing in said at least one first or second track, respectively, so as to make the bit-rate of the signals written in said at least one first track, said at least one second track and said at least one third track substantially constant.

13. Recording arrangement as claimed in claim 8, characterized in that the data reduced video signal is a video signal of the MPEG type, the first signal blocks in the video signal of the MPEG type comprising intra picture encoded video information of the I type.

14. Recording arrangement as claimed in claim 9, characterized in that the data reduced video signal is a video signal of the MPEG type, the first signal blocks in the video signal of the MPEG type comprising intra picture encoded video information of the I type, the second signal blocks in the video signal of the MPEG type comprising inter picture encoded video information of the P type and the third signal blocks comprising bi-directionally inter-picture encoded information of the B type.

15. Reproducing arrangement for reproducing a data reduced digital video signal recorded in tracks on a longitudinal record carrier, the reproducing arrangement comprising:

reading means for reading the data reduced digital video signal from said tracks; and an output terminal for supplying the data reduced digital video signal; the data reduced digital video signal comprising first signal blocks having data reduced video information obtained from video information of a picture that has been subjected to an intra-picture encoding step prior to recording, and comprising second signal blocks having data reduced video information obtained from video information of a picture that has been subjected to an inter-picture encoding step prior to recording, characterized in that, the reproducing arrangement is a reproducing arrangement of the linear reproducing type, the reading means comprising first reading means for reading information recorded in at least one first track running in the longitudinal direction of the record carrier and second reading means for reading information recorded in at least one second track running in the longitudinal direction on the record carrier, the first reading means being adapted to read first signal blocks and second signal blocks (if present) from said at least one first track, the second reading means being adapted to read first signal blocks (if present) and second signal blocks from said at least one second track, said reproducing arrangement further comprising:

detection means for detecting additional information which has a relation to the sequence of the signal blocks in the data reduced video signal prior to recording, said additional information having been stored in at least a number of said first and second signal blocks prior to recording; and combination means for combining, in a 'normal play' reproduction mode, the first signal blocks and the second signal blocks in response to said detected additional information, so as to obtain a first replica of said data reduced digital video signal, and that in a 'trick play' reproduction mode, the combination means are further adapted to retrieve the first signal blocks read from said at least one first track only so as to obtain a second replica of said data reduced digital video signal.

16. Reproducing arrangement as claimed in claim 15, characterized in that the data reduced video signal further comprises third signal blocks having data reduced video information obtained from video information of a picture that has been subjected to a bi-directional inter-picture encoding step, the reading means further being adapted to read third signal blocks from a track on the record carrier, the detection means further being adapted to detect said additional information which may be present in at least a number of the third signal blocks, that in said 'normal play' reproduction mode the combining means are further adapted to combine the first, second and third signal blocks in response to said detected additional signal, so as to obtain said first replica of said data reduced digital video signal.

17. Reproducing arrangement as claimed in claim 16, characterized in that the second reading means are further adapted to read third signal blocks from said at least one second track.

18. Reproducing arrangement as claimed in claim 17, characterized in that in that the first reading means are also adapted to read third signal blocks (if present) from said at least one first track.

19. Reproducing arrangement as claimed in claim 16, characterized in that the reading means further comprises third reading means for reading information recorded in at least one third track running in the longitudinal direction of the record carrier, the first reading means being adapted to read first signal blocks, second signal blocks (if present) and third signal blocks (if present) from said at least one first track, the second reading means being adapted to read first signal blocks (if present), second signal blocks and third signal blocks (if present) from said at least one second track, the third reading means being adapted to read first signal blocks (if present), second signal blocks (if present) and third signal blocks from said at least one third track.

20. Reproducing arrangement as claimed in claim 15, characterized in that the data reduced video signal is a video signal of the MPEG type, the first signal blocks in the video signal of the MPEG type comprising intra picture encoded video information of the I type.

21. Reproducing arrangement as claimed in claim 16, characterized in that the data reduced video signal is a video signal of the MPEG type, the first signal blocks in the video signal of the MPEG type comprising intra picture encoded video information of the I type, the second signal blocks in the video signal of the MPEG type comprising inter picture encoded video information of the P type and the third signal blocks comprising bi-directionally inter-picture encoded information of the B type.

22. Longitudinal record carrier obtained by the recording arrangement as claimed in claim 8, having a data reduced digital video signal recorded in tracks on the record carrier, the data reduced digital video signal comprising first signal blocks having data reduced video information obtained from video information of a picture that has been subjected to an intra-picture encoding step, and comprising second signal blocks having data reduced video information obtained from video information of a picture that has been subjected to an inter-picture encoding step, characterized in that the record carrier has at least one first track and at least one second track running in the longitudinal direction of the record carrier, first signal blocks being recorded in said at least one first track, second signal blocks being recorded in said at least one second track, further first signal blocks being recorded in said at least one second track, or further second signal blocks being recorded in said at least one first track, so as to make the bit-rate of the signals written in said at least one first track and said at least one second track substantially constant.

23. Longitudinal record carrier as claimed in claim 22, characterized in that at least a number of said first and second signal blocks comprise additional information which has a relation to the sequence of the signal blocks in the datastream of the data reduced video signal prior to recording.

24. Reproducing arrangement for reproducing a data reduced digital video signal recorded in a track on a longitudinal record carrier in a feature mode with the record carrier speed being larger than nominal, the reproducing arrangement comprising:

reading means for reading a signal from said track;

decoding means for decoding the signal read from said track so as to obtain the data reduced digital video signal; and an output terminal for supplying the data reduced digital video signal, the data reduced digital video signal comprising first signal blocks having data reduced video information obtained from video information of a picture that has been subjected to an intra-picture encoding step prior to recording, and comprising second signal blocks having data reduced video information obtained from video information of a picture that has been subjected to an inter-picture encoding step prior to recording, characterized in that, the reproducing arrangement is a reproducing arrangement of the linear reproducing type, the reading means comprising:

a reading head for reading information from the track;

memory means for storing information read from the track with a first rate and reading out said information with a second rate, said second rate being lower than said first rate;

detection means for detecting the start of a first signal block present in the signal read from the track;

address generating means for generating read-in addresses at said first rate, and for generating read-out addresses at said second rate; and comparator means for comparing a filling degree of the memory means with a threshold value ($T_a$), the reading means being adapted to carry out the following steps:

(a) the address generating means being adapted to generate subsequent read-in addresses at said first rate and read-out addresses at said second rate, starting with a start address, for storing the information in and reading the information from subsequent storage locations in said memory means;

(b) upon the detection of the start of a first signal block present in the information read out from the memory by the detection means, an enable signal being generated so as to enable the decoding unit to start decoding the information corresponding to said first signal block; and (c) upon detection of the current filling degree being larger than or equal to said threshold value, the storage of information in said memory means being terminated, and that the reading means are adapted to return to (a) in response to termination of the decoding of said first signal block.

25. Reproducing arrangement as claimed in claim 24, characterized in that, if during the step (a), the current filling degree is larger than a second threshold value, the step (a) is restarted.

26. Reproducing arrangement as claimed in claim 24, characterized in that the data reduced video signal is a video signal of the MPEG type, the first signal blocks in the video signal of the MPEG type comprising intra picture encoded video information of the I type.

* * * * *